Oct. 20, 1953 R. H. HERRICK ET AL 2,656,407

SUBSCRIBER SIGNALING SYSTEM

Filed Feb. 12, 1949 10 Sheets-Sheet 1

ROSWELL H. HERRICK
ERWIN M. ROSCHKE
*INVENTOR.*

BY Bruce Burkard

THEIR AGENT

ROSWELL H. HERRICK
ERWIN M. ROSCHKE
*INVENTOR.*
BY Bruce L. Birchard
THEIR AGENT Oct. 20, 1953 R. H. HERRICK ET AL 2,656,407

SUBSCRIBER SIGNALING SYSTEM

Filed Feb. 12, 1949 10 Sheets-Sheet 3

ROSWELL H. HERRICK
ERWIN M. ROSCHKE
*INVENTOR.*

BY Bruce G. Birchard

THEIR AGENT

ROSWELL H. HERRICK
ERWIN M. ROSCHKE
*INVENTOR.*
BY Bruce L Birchard
THEIR AGENT

ROSWELL H. HERRICK
ERWIN M. ROSCHKE
INVENTOR.
BY Bruce Burchard
THEIR AGENT

ROSWELL H. HERRICK
ERWIN M. ROSCHKE
*INVENTOR.*
BY Bruce Burchard
THEIR AGENT

ROSWELL H. HERRICK
ERWIN M. ROSCHKE
INVENTOR.
BY Bruce Buchanan
THEIR AGENT

SUBSCRIBER SIGNALING SYSTEM

ROSWELL H. HERRICK
ERWIN M. ROSCHKE
*INVENTOR.*
BY Bruce Birchard
THEIR AGENT

SUBSCRIBER SIGNALING SYSTEM

Filed Feb. 12, 1949 10 Sheets-Sheet 9

ROSWELL H. HERRICK
ERWIN M. ROSCHKE
*INVENTOR.*
BY [signature]
THEIR AGENT

ROSWELL H. HERRICK
ERWIN M. ROSCHKE
*INVENTOR.*
BY Bruce Birchard
THEIR AGENT

Patented Oct. 20, 1953 2,656,407

UNITED STATES PATENT OFFICE 2,656,407

SUBSCRIBER SIGNALING SYSTEM

Roswell H. Herrick, Lorain, Ohio, and Erwin M. Roschke, Broadview, Ill., assignors to Zenith Radio Corporation, a corporation of Illinois Application February 12, 1949, Serial No. 75,988

16 Claims. (Cl. 178—5.1)

This invention relates to coded electrical signalling systems of the subscription type, and more particularly to such systems in which coded electrical signals are transmitted on one channel, and key signals for decoding the electrical signals are transmitted solely to authorized subscriber receivers on a second channel.

The accompanying drawings and associated text describe the technical details and method of operation of a subscription type of television system embodying the instant invention. However, it may be helpful to have as background information a simplified explanation of the underlying principles of that system to facilitate a quick understanding of the illustrated arrangements.

In accordance with one form of the invention, a television transmitter is provided with a coding arrangement which, in response to an applied signal, is capable of changing the operation of the transmitter from one mode to another, the change in modes constituting a coding function to introduce an aspect of privacy by virtue of which unauthorized receivers are not able to utilize the transmitted program signal. A control signal which may have a random amplitude is established in a suitable vehicle, such as a tape, a record disc, a memory tube, or the like, so that a scanning element or other pick-off device may recurrently derive the recorded or stored signal. This derived signal is applied to the coding arrangement to effect a change from one mode of operation to another in the transmitter in a prescribed coding schedule represented by the amplitude variations of the control signal. Preferably, the cycle of the coding schedule is very short with respect to any program period. Hence, the transmitted signal is coded in accordance with a repeating coding schedule many times in a given program.

Obviously, it is necessary that subscriber receivers be supplied with a key to enable their utilization of the otherwise unintelligible transmitted signal. To that end, it is contemplated in the present invention that the subscriber place a call to an exchange associated with the aforedescribed transmitter. In practical utilization of the system, this call is made prior to the program interval in which the subscriber is interested. During the time that the line connection is completed for the call, the control signal of the transmitter derived by scanning the record or storage device as indicated above is delivered over the line circuit to the receiver where it is likewise recorded on a vehicle similar to that utilized in the transmitter. Moreover, the receiver is provided with apparatus which is complementary to the coding arrangement of the transmitter and which is subject to the influence of a key signal to decode the received but scrambled transmission. A key signal, for application to the decoding arrangement, is obtained by scanning the record or storage unit in the receiver. Thus, considering the receiver alone, its decoding arrangement receives a key signal that represents the coding schedule of the scrambled transmission and responds to that key signal to effect compensating changes in the mode of operation to accomplish decoding. The decoding thus obtained permits the receiver to utilize the received program signal and reproduce intelligible images.

For cooperative action on the part of the transmitter and receiver, it is necessary that their operations be precisely correlated. It has already been explained that the coding at the transmitter and the decoding at the receiver are fully complementary but synchronizing and phasing must also be realized. The synchronizing is essentially simple and may be satisfied by synchronizing the scanning at the transmitter and receiver to operate at identical and synchronous speeds. Phasing is attained by comparing the time relation of corresponding portions of the coding cycles at the transmitter and receiver. For that purpose, a special phasing signal may be sent out from the transmitter at the start of a coding cycle and preferably during a field retrace interval so that it has no adverse effect on the picture information. Likewise, a phasing signal may be provided in the record or storage device at the receiver to represent the start of its coding cycle. These phasing signals may be applied to what is essentially a phase detector which provides a control effect in accordance with the time relation of the compared phase signals in any coding cycle. That control effect may adjust the scanning at the receiver to maintain proper phase as well as synchronizing relations. Although the coding information is supplied to the receiver usually prior to the program interval, the phase correction alluded to takes place during the assigned program interval so that the authorized receiver may enjoy the transmission to which it has subscribed, whereas unauthorized receivers experience wholly unintelligible reception of such programs.

Subscription type signalling systems have been proposed wherein television signals are radiated in coded form, and key signals for decoding the coded signals are transmitted to authorized subscriber receivers over suitable line circuits, such as the telephone lines. The key signals are supplied to individual subscribers upon request and a suitable charge is made for the use thereof. Such systems, as heretofore proposed, require the continuous use of the telephone lines as a transmission link for the key signals, and have been objected to on the ground that they unduly interfere with the normal service of the telephone system.

The present invention provides a subscription type of signalling system in which coded signals are transmitted to subscriber receivers, and key signal information required to enable the receivers to decode the coded signals for a long period of time is supplied thereto over the telephone lines, but in an extremely short time interval and by means of an essentially normal telephone call. In this manner, continuous use of the telephone lines for supplying key signals throughout entire program intervals is avoided, and no objection may be raised to the effect that the system interferes with the normal service of the telephone line.

It is, therefore, an object of this invention to provide a coded signalling system of the subscription type in which key signals for decoding the coded signals are produced and distributed to subscriber receivers in an improved and more convenient manner than in previous systems of this type.

Another object of this invention is to provide such a system in which sufficient key signals for decoding the coded program signals for a relatively long period of time are produced and distributed to individual subscriber receivers in a relatively short time interval, preferably, before the transmission of the coded program signals, whereby more efficient use is made of the key signal channel, that is, this channel is not used continuously by an individual subscriber but for short time intervals only, leaving the channel free for other purposes and for use by other subscribers during periods when it is not in use by the first mentioned subscriber.

Yet another object of this invention is to provide such a system in which use may be made of telephone networks to distribute the key signal to subscriber receivers, whereby each subscriber uses the telephone network for an extremely short time interval to obtain sufficient key signals to decode the received coded signals for a program that may extend over a relatively long period of time.

A further object of this invention is to provide a receiver for use in such a coded signalling system, which receiver is capable upon the receipt of a key-signal pattern to utilize this pattern recurrently to decode the received coded signals.

The features of this invention which are believed to be new are set forth with particularity in the appended claims. The invention itself, however, together with further objects and advantages thereof may best be understood by reference to the following description when taken in conjunction with the accompanying drawings, in which:

Figure 1:
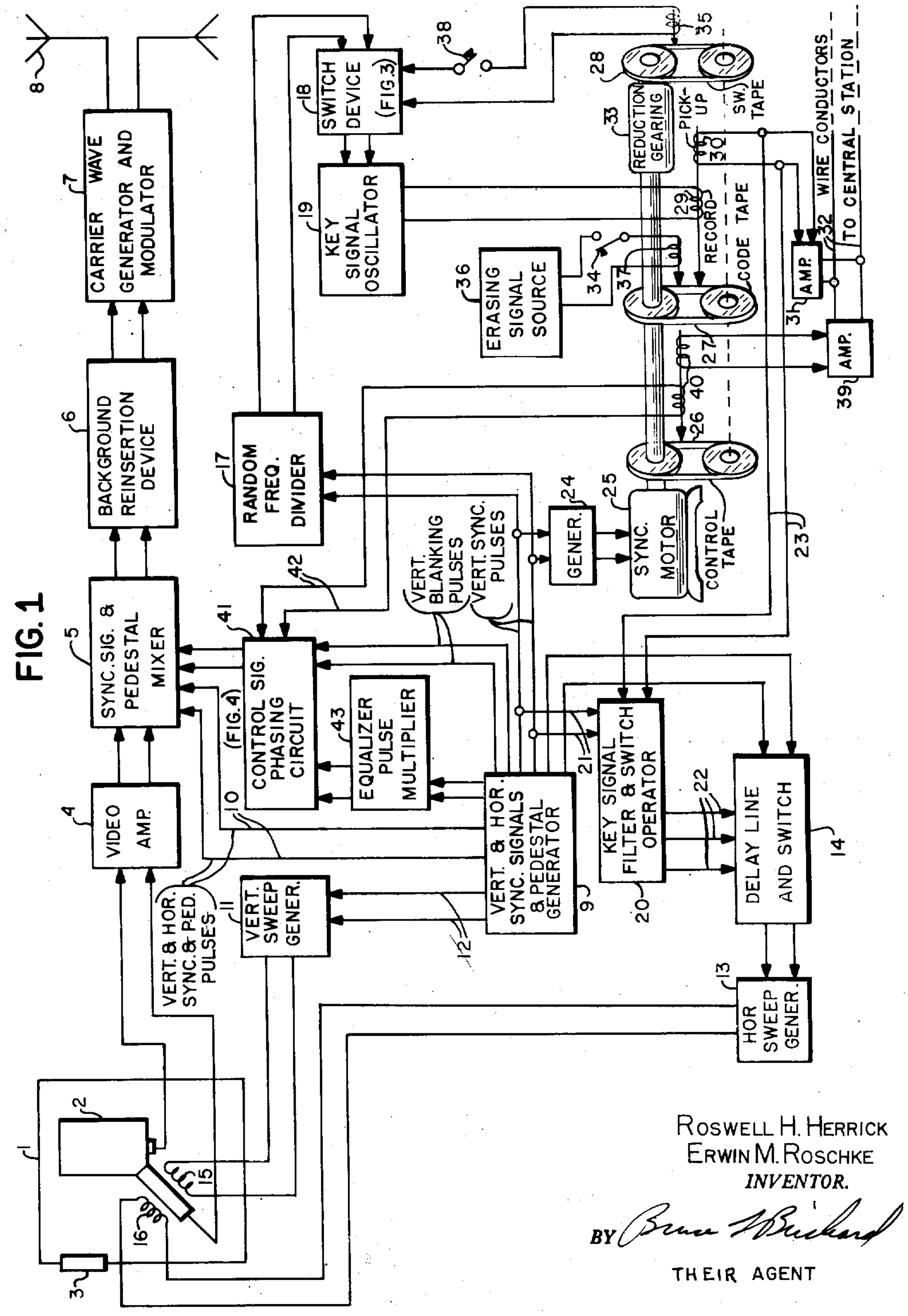
Figure 1 shows a transmitter which incorporates the present invention.
Figure 2:
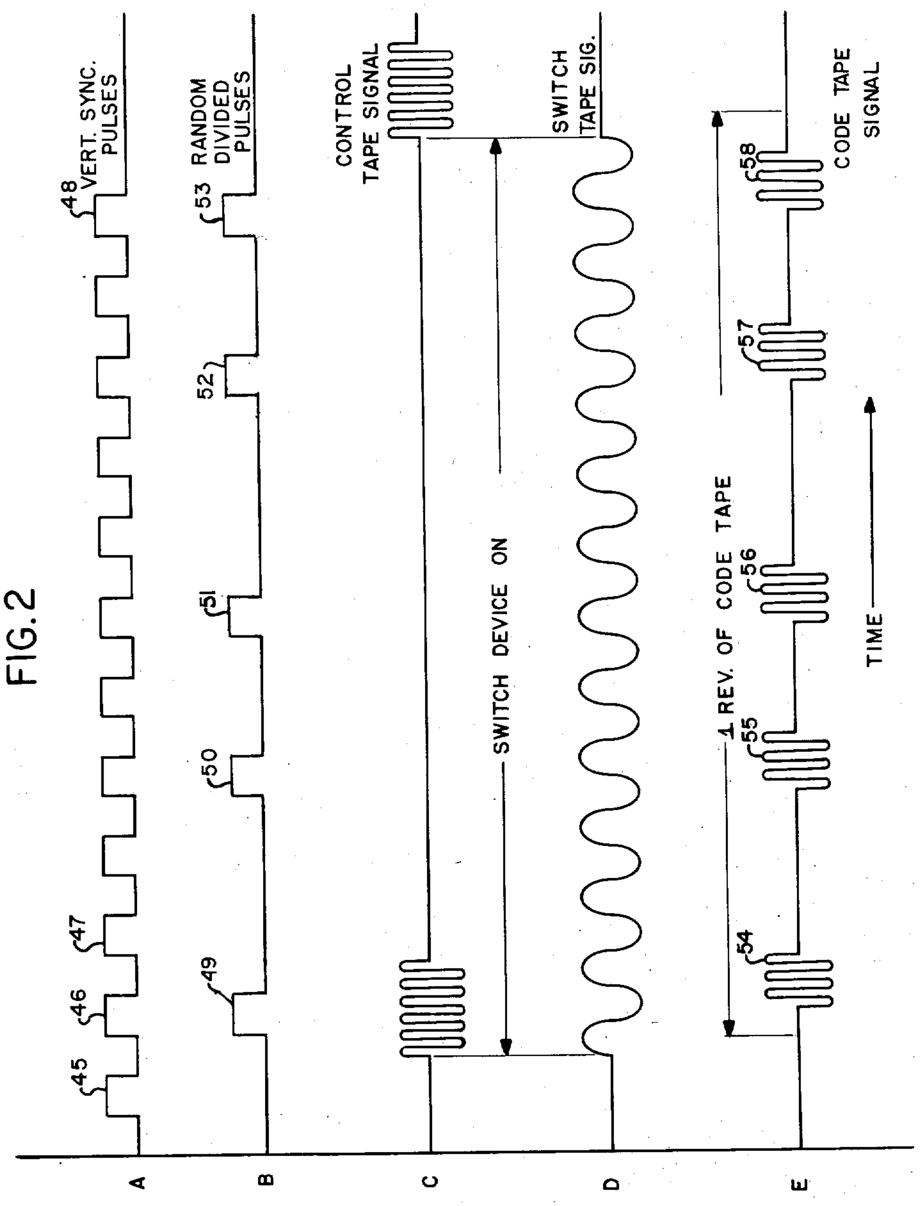
Figure 3:
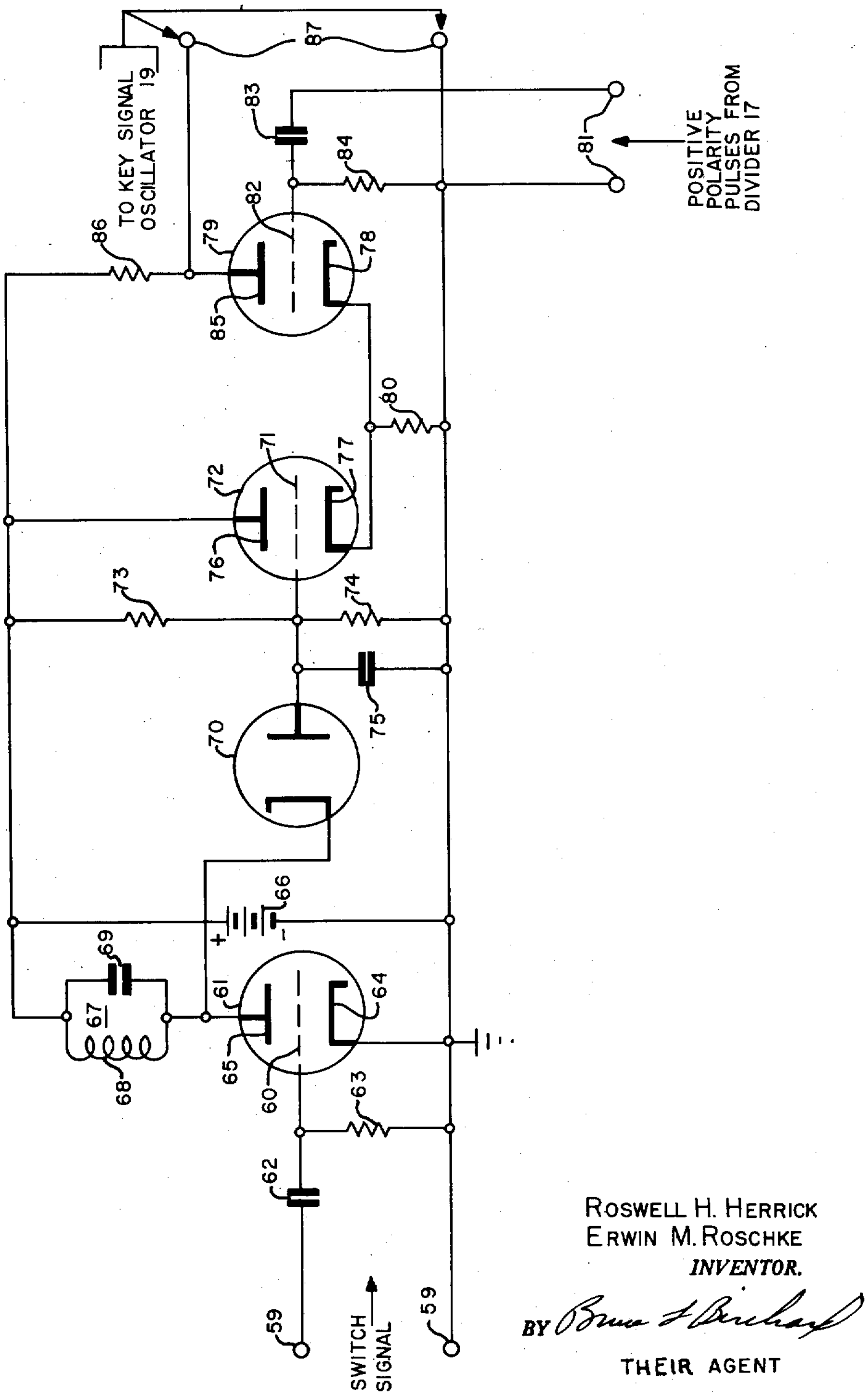
Figure 4:
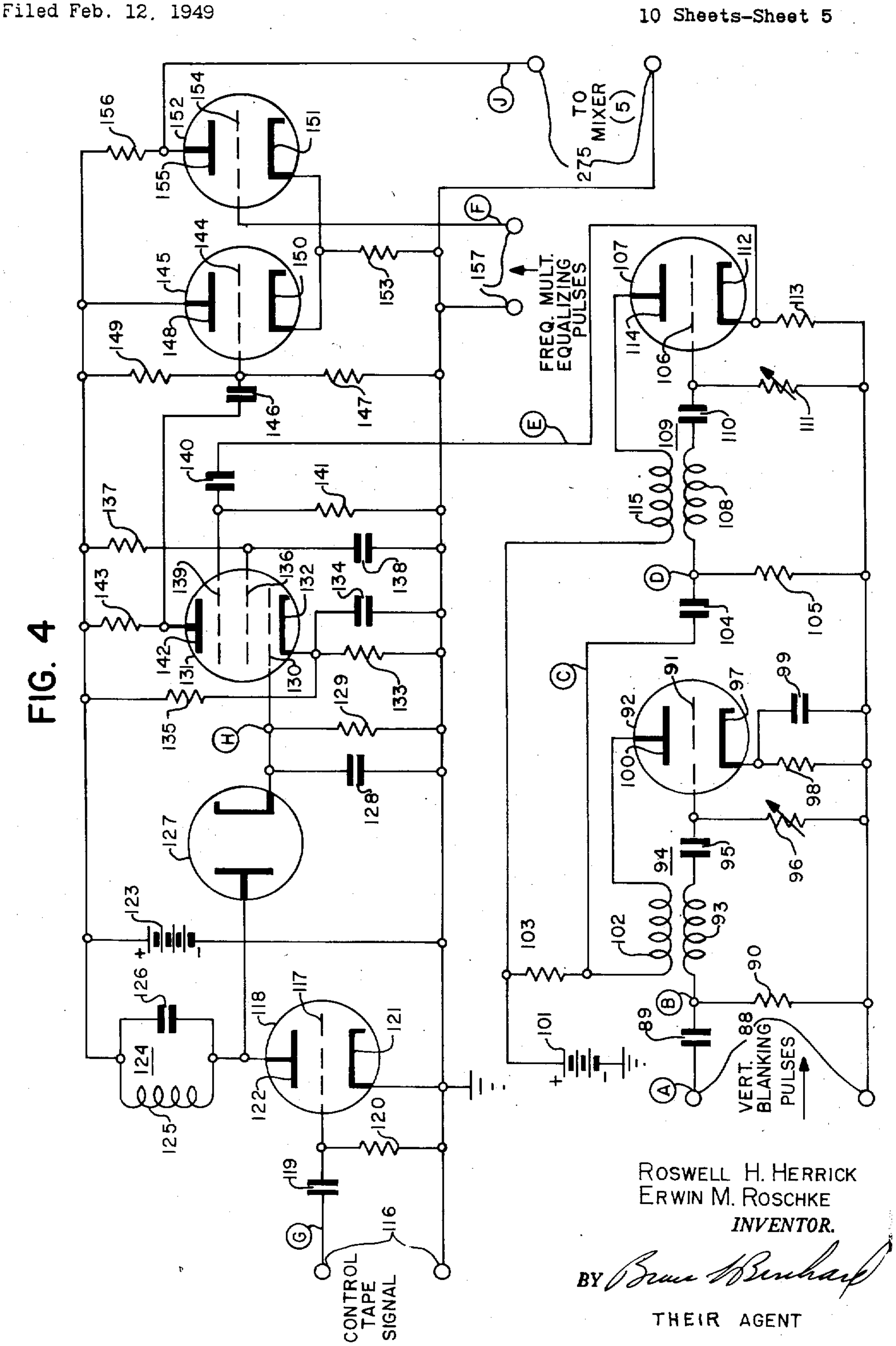
Figure 5:
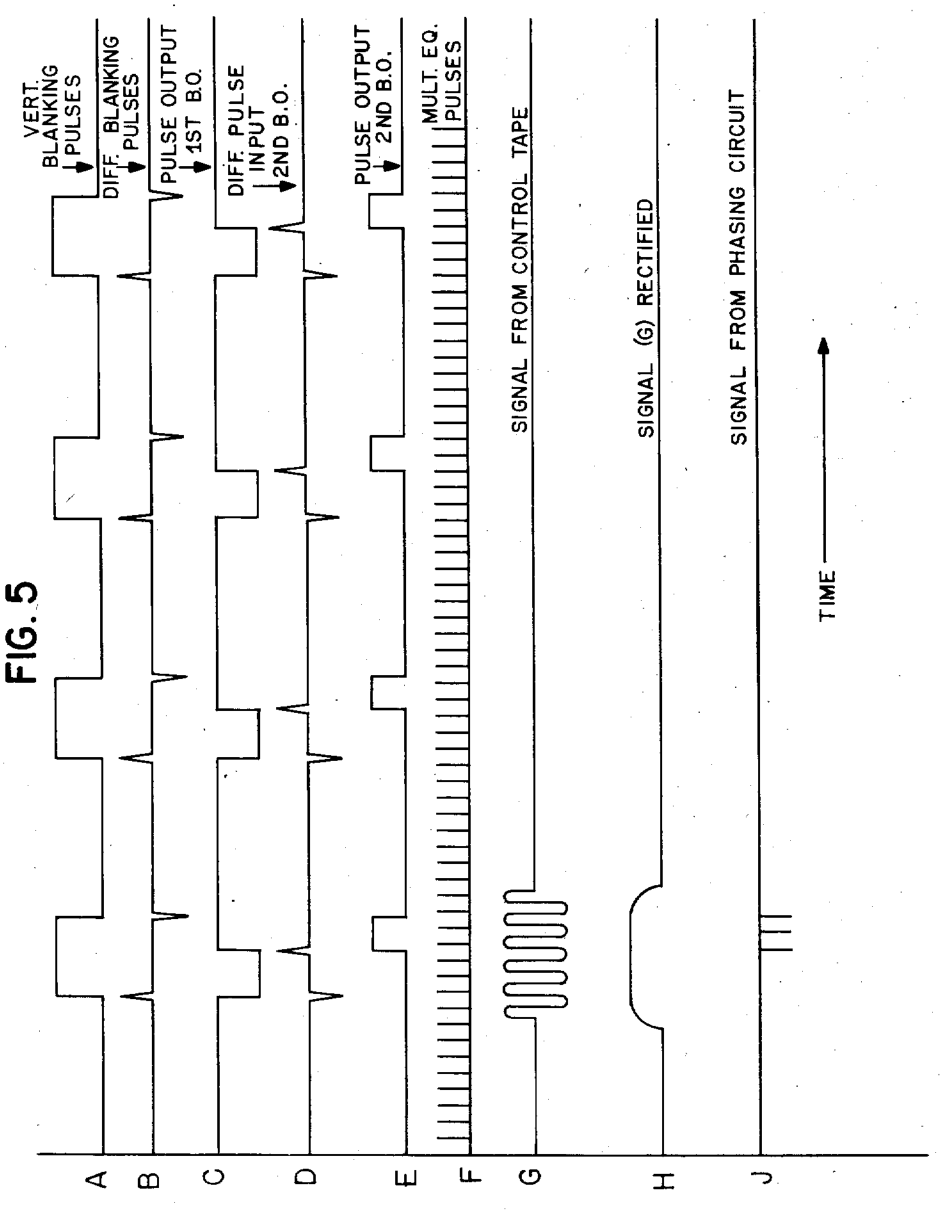
Figure 6:
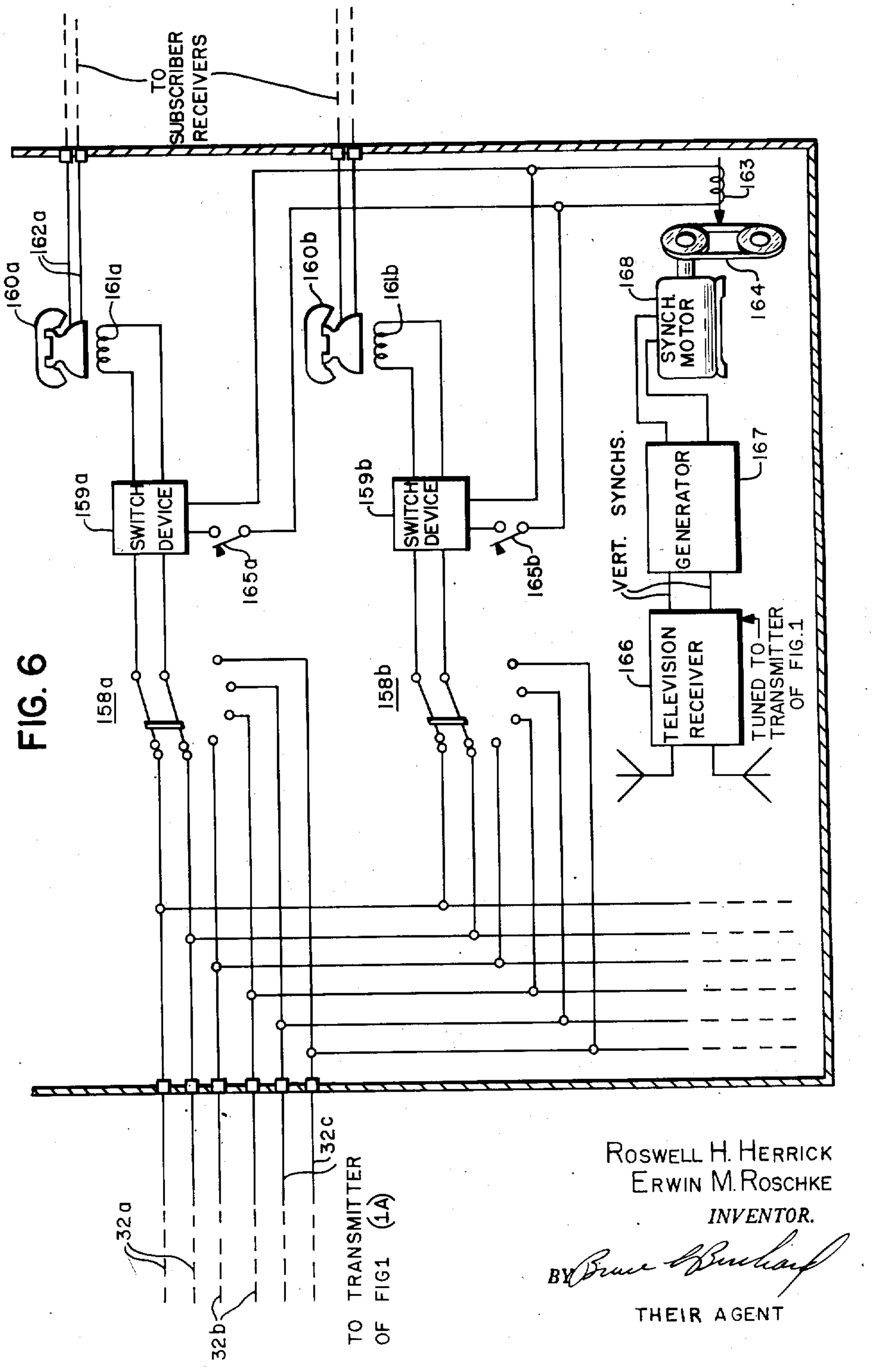
Figure 7:
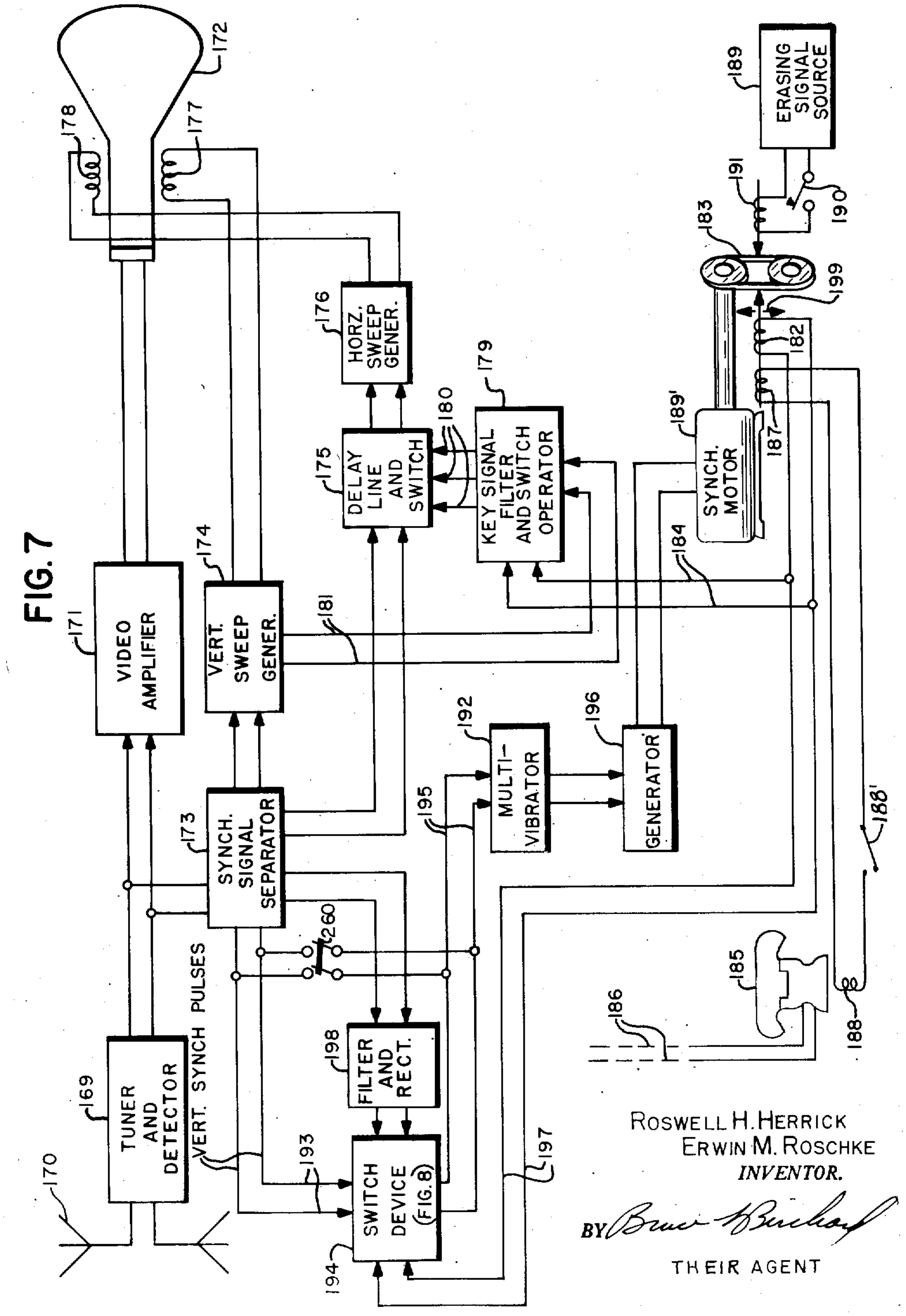
Figure 7A:
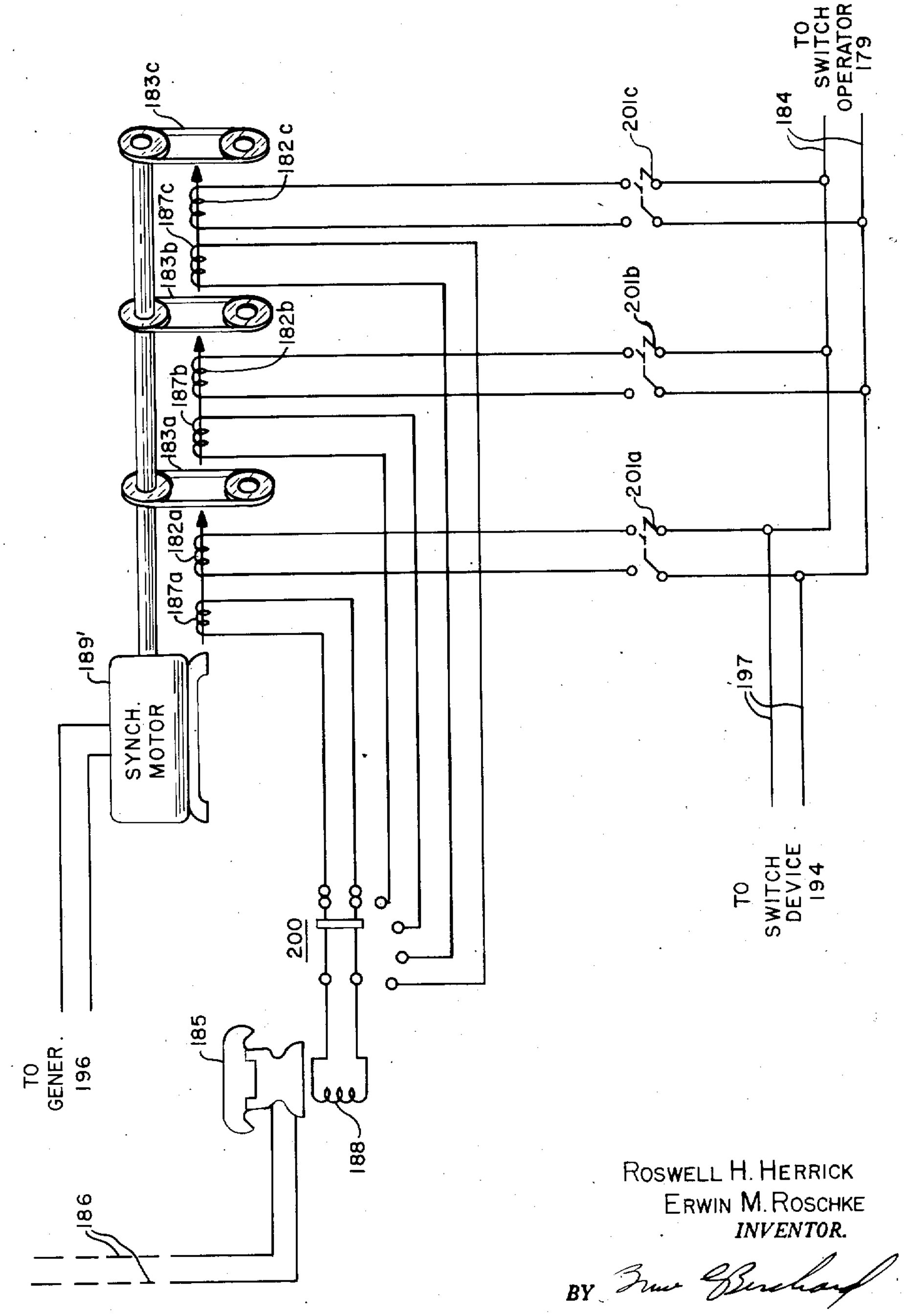
Figure 8:
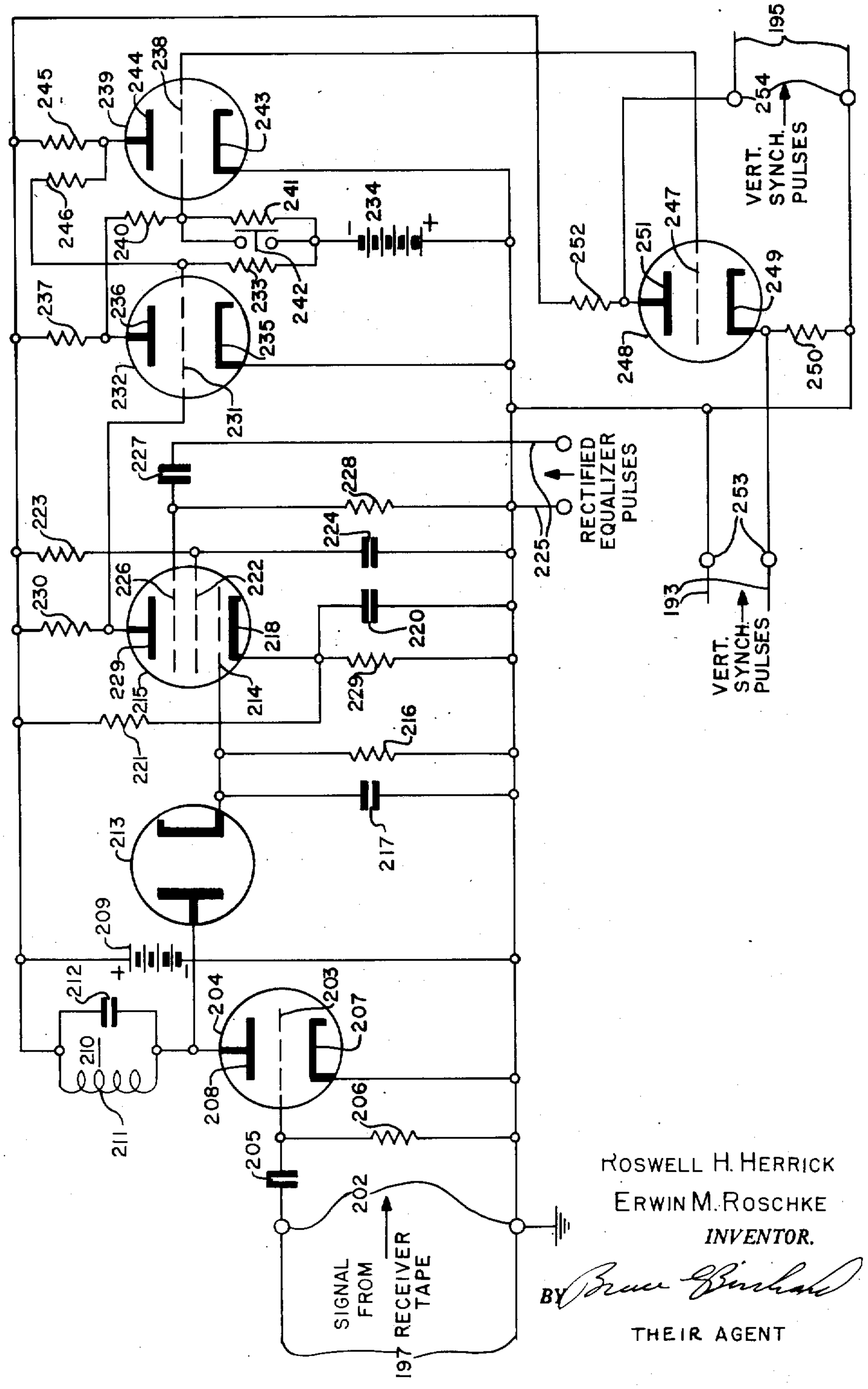

Figure 2 shows diagrams useful in the understanding of the operation of the transmitter of Figure 1, Figures 3 and 4 show in detail the circuits of certain components of the transmitter of Figure 1, Figure 5 shows diagrams useful in the understanding of the operation of the circuit of Figure 4, Figure 6 shows a convenient system for use as a central distributing station, Figure 7 shows a receiver for operation in conjunction with the systems of Figures 1 and 6, Figure 7A shows a modification of a portion of the receiver of Figure 7, and Figure 8 shows in detail the circuit of one of the components of the receiver of Figure 7.

Copending application Serial No. 742,374, filed April 18, 1947, entitled "Radio Wire Signalling System," by Alexander Ellett et al., which has now issued as Patent 2,510,046, May 30, 1950; and copending application Serial No. 773,848, filed September 13, 1947, entitled "Image Transmission System," By Erwin M. Roschke, now issued as Patent 2,547,598, April 3, 1951, both assigned to the present assignee, disclose typical coded electrical signalling systems of the subscription type. In these systems, coded program signals are radiated and key signals for decoding the coded signals are distributed to subscriber receivers over suitable wire line conductors. In such systems the key signals are transmitted continuously over these conductors to the subscriber receivers throughout the entire program period. In accordance with the present invention, sufficient key signal information for decoding the coded electrical signals for long periods of time are transmitted to the subscriber receivers in a brief time interval, and not continuously. Hence, when a telephone network is used for the distribution of the key signals, a subscriber may obtain sufficient information by means of a short telephone call, to enable his receiver to decode the coded signals for a long program interval, for example, for several hours.

The present invention will be described as applied to a coded subscription signalling system, such as the system disclosed in application Serial No. 773,848. However, it is to be understood that the invention may similarly be applied to other types of such systems, such as those disclosed in application Serial No. 742,374. The systems of Figures 1 and 7 are similar in many respects to the system shown in application Serial No. 773,848 and many of the components of the systems of Figures 1 and 7 have been described in detail in that application. Since these components in themselves form no part of the present invention, a detailed description thereof is believed to be unnecessary.

Referring now to Figure 1, the transmitter there represented schematically includes a camera 1 having mounted therein a television picture converting device 2 of the iconoscope, image orthicon, or any other suitable type. The camera 1 includes a lens system 3 for focusing images of scanned subjects on the device 2. The output of device 2 is coupled to a video amplifier 4 which in turn is coupled to a synchronizing signal and pedestal mixer amplifier 5. The mixer amplifier 5 is coupled through a background reinsertion device 6 to a carrier wave generator and modulator 7, and the modulator may be coupled to any suitable type of antenna 8. Vertical and horizontal synchronizing pulses and blanking pedestals are generated in the system by means of a generator 9, this generator being coupled to the mixer amplifier 5 by way of leads 10 and to a vertical sweep generator 11 by way of leads 12. The generator 9 is also coupled to a horizontal sweep generator 13 through a delay line and switch 14. The vertical and horizontal sweep generators are respectively coupled to the vertical sweep coils 15 and to the horizontal sweep coils 16 of device 2. The generator 9 is further coupled to a random frequency divider 17 which may be of the type disclosed and claimed in copending application Serial No. 32,457, Erwin M. Roschke, entitled "Random Frequency Divider," filed June 11, 1948, now issued as Patent 2,588,413, March 11, 1952, and assigned to the present assignee. The divider 17 is connected through a switching device 18 to a key signal oscillator 19. Generator 9 is also coupled to a key signal filter and switch operator 20 by way of leads 21, the switch operator 20 being connected to the delay line and switch 14 by means of three leads 22.

In the operation of the system thus far described, video-frequency signals representing a scanned object are produced by the device 2. These signals are amplified in the video amplifier 4 and the amplified signals are mixed in the mixer amplifier 5 with vertical and horizontal synchronizing pulses and blanking pedestals from the generator 9. The resulting composite television signal from mixer amplifier 5 is passed through the background reinsertion device 6, and this signal, properly adjusted as to background level, is modulated on a suitable carrier wave in stage 7, the modulated carrier wave being radiated from the antenna 8. The vertical and horizontal scannings of the device 2 are controlled respectively by the sweep generators 11 and 13. The vertical sweep generator 11 is synchronized directly by generator 9 through leads 12, and the horizontal sweep generator 13 is synchronized by generator 9 through the delay line and switch 14. The delay line and switch 14 has two positions, and when in one of these positions this stage passes the horizontal synchronizing pulses directly to the generator 13, and when in the other of these positions these pulses are delayed a certain time interval. The delay line and switch 14 is switched from one position to the other by the switch operator 20 through leads 22, and this switching at spaced time intervals causes the horizontal synchronizing pulses passing therethrough to be delayed during such intervals. This delay causes the generator 13 to delay the timing of the horizontal scanning of device 2 and, hence, during these spaced time intervals the video-signal components of the radiated television signal are delayed with respect to the synchronizing-signal components thereof, thus effectively coding the radiated signal.

Vertical synchronizing pulses from the generator 9 are randomly frequency divided in the frequency divider 17, and when the switching device 18 is closed these pulses cause the key signal oscillator 19 to generate bursts of key signal, each burst corresponding to a pulse from divider 17. In a manner to be described, these bursts are recorded for a predetermined interval to form a key signal pattern in a recording device, or other suitable signal storage device, and this pattern from the recording device is impressed recurrently as a coding signal on the switch operator 20 over the leads 23 which connect the recording device to the switch operator. The key signal filter and switch operator 20, in response to the coincidence of a burst of key signal on the leads 23 and a vertical synchronizing pulse on the leads 21, actuates the delay line and switch 14, such actuation thereby commencing during vertical retrace intervals of the device 2. In this manner, changes in the television signal from a normal mode to a mode in which the video signal is delayed with respect to the synchronizing signal due to actuation of the delay line and switch 14 take place during these vertical retrace intervals and distortion in the image reproduced in subscriber receivers is thereby avoided.

A detailed description of the above described type of coding system is given in application Serial No. 773,848, together with a description of the circuits and operation of the various components, and further description herein is believed to be unnecessary. As previously stated, the present system differs from the system of the above application in that signals from oscillator 19 are not impressed continuously on the switch operator 20 over the leads 23, but these key signals are recorded for a certain time interval to obtain a key signal pattern, and this pattern is impressed recurrently as a coding signal on the switch operator 20 over the leads 23 during the program interval when the coded television signal is radiated from antenna 8.

The term "key signal pattern" is used to refer to a number of key signal bursts from the key signal oscillator 19 which are recorded and used recurrently as a coding signal to effect coding of the television signal.

The following is a detailed description of the means whereby the key signals from oscillator 19 are recorded to obtain the key signal pattern.

Vertical synchronizing signals from the generator 9 are used to synchronize the generator 24 to the frequency of these synchronizing signals, or some harmonic thereof, and the generator 24 drives a motor 25. This motor, in turn, drives a recorder which is shown to comprise endless magnetic tapes 26, 27 and 28. These tapes, and others to be described herein, are, preferably, rotated by the driving disks by means of sprockets such as the film in motion picture projectors to insure that there is no slippage. Furthermore, the illustrated recorders may be replaced by any known type of signal storage device, such as memory tubes, disk or wire recorders, and the like. The pulses from the frequency divider 17 are passed through the switching device 18 to the key signal oscillator 19. Switching device 18 is arranged, in a manner to be described, so that when it is closed, pulses from the frequency divider 17 energize the oscillator 19, and generated oscillations are recorded on the tape 27 through a recorder head 29, the tape 27 being designated as the "code tape." Switching device 18 is so controlled that it remains closed for not more than one revolution of the code tape 27 and a pattern of key signals from oscillator 19 is thereby recorded on this tape. The key signal pattern recorded on tape 27 is used recurrently to actuate switch operator 20, this pattern being impressed on the switch operator over leads 23, which leads extend to the operator from a pick-up head 30 associated with the code tape 27. The pattern of key signals from the pick-up head 30 is further impressed through an amplifier 31 on conductors 32, forming a line circuit leading to a central distributing station, to be described. Conductors 32 may be any form of a link between the transmitter and the distributing station, and, when desired, the pattern of key signals may be radiated to this station from the transmitter, thus dispensing with these conductors.

It is necessary that switching device 18 close and open in an interval between the pulses from frequency divider 17 and also that this switching device remain closed for no more than one revolution of the code tape 27. To accomplish this, tape 28 which is designated the "switch tape" is rotated by motor 25 at a speed much slower than tapes 26 and 27, by means of a reduction gear 33, tapes 26 and 27 rotating preferably at the same speed. For example, when the tapes 26 and 27 are rotated at the preferred speed of 60 revolutions per minute, tape 28 may be rotated at one revolution per minute. A switching signal having a frequency, for example, of 3,000 cycles per second is recorded by any known means on the switch tape 28, and this tape is adjusted so that this switch signal is phased with respect to the vertical synchronizing signals of the system to close the switching device 18 in an interval between succeeding pulses from the frequency divider 17. The duration of the switching signal recorded on the switch tape 28 is made such that when this signal is impressed on the switching device 18, this device is closed for one revolution only of the code tape 27. Therefore, when it is desired to record a key signal pattern on the code tape 27, or to change an existing pattern on this tape, a switch 34 in the leads connecting an erasing signal source 36 to the erasing head 37 associated with the code tape 27 is closed for several seconds in an interval before the leading edge of the switch signal on the switch tape 28 reaches the pick-up head 35 associated with the switch tape. Closing the switch 34 applies an erasing signal from the source 36 to the erasing head 37, and an existing signal on the code tape 27 is thereby erased. Switch 34 is then opened and a switch 38 in the leads connecting the pick-up head 35 to the switch device 18 is closed. Now, when the switching signal on the switch tape 28 reaches the pick-up head 35, the switch device 18 closes and passes pulses from the divider 17 to the key signal oscillator 19. The switch device 18 is maintained closed by the switch signal from the switch tape 28 for one revolution of the code tape 27, and during this revolution of the code tape a new key signal pattern is recorded thereon. When the code tape 27 has completed the revolution, the trailing edge of the switch signal recorded on tape 28 passes the pick-up head 35, and the switch device 18 opens. This new key signal pattern may thereafter be picked up by the pick-up head 30 associated with the code tape 27, and applied recurrently to the switch operator 20 over the leads 23 to actuate this operator, as previously described.

Therefore, in the system thus far described, a coded composite television signal is radiated from antenna 8 in which, during spaced time intervals, the video-frequency components are delayed a certain amount with respect to the synchronizing-signal components of this composite signal, and in which the change from a normal mode of the television signal to a mode in which the video-frequency components are so delayed takes place during vertical retrace intervals. This coding of the television signal is effected by the switch operator 20 in response to the coincidence of vertical synchronizing pulses on leads 21, and respective key signal bursts of the key signal pattern on leads 23. The described system also provides for the transmission of the key signal pattern to subscriber receivers over the line circuit 32 and through a central distributing station.

The tape 26 is designated the "control tape," and as previously mentioned, this tape is preferably driven at the same rate of speed as the "code tape" 27. The purpose of the control tape 26 is to provide a control signal so that a "decoding tape" at a subscriber receiver may be synchronized with the code tape 27, in a manner to be described. The control signal is recorded by any known means on the control tape 26, and the control tape is adjusted so that this control signal is phased to indicate preferably the point on the code tape 27 of the commencement and termination of the key signal pattern recorded on the last mentioned tape. The control signal recorded on the control tape 26 is given a frequency substantially different than the frequency of the key signal bursts recorded on the code tape 27 and the control signal is transmitted to subscriber receivers with the key signal over the line circuit 32 and through the central distributing station.

The control signal recorded on the control tape 26 is also used to cause a second control signal to be transmitted to the subscriber receivers over the same channel as the coded television signals. In a manner to be described, the subscriber receivers utilize the time coincidence of the two control signals to effect synchronism between decoding tapes at the receivers and the code tape 27. As stated, the first control signal is transmitted to the subscriber receivers over the line circuit 32, this signal being picked-up from the control tape 26 by a pick-up head 40 associated with this tape and amplified in an amplifier 39 that is sharply tuned to the frequency of this signal and has its output terminals coupled to the line circuit 32 to apply this control signal thereto. Furthermore, the control signal from the pick-up head 40 is impressed on a control signal phasing circuit 41 over the leads 42. The circuit 41 acts in a manner to be described, to pass at proper intervals vertical equalizer pulses from generator 9 to the mixer amplifier 5, these pulses having been frequency multiplied in a frequency multiplier 43. The pulses passed by the circuit 41 form the second control signal and this signal is transmitted to subscriber receivers over the television signal channel.

In the embodiment of Figure 1, the various operations of erasing a key signal pattern from the code tape 27, and recording a new pattern thereon are preferably completed before actual transmission of the television program by the system. It is contemplated in this embodiment that a key signal pattern on the code tape 27 be used recurrently to code the television signal for an interval corresponding to one or more television programs, for example, for one or two hours. After this program interval, the pattern is changed and a new pattern recorded on the code tape 27 for effecting coding during the next succeeding program interval. Hence, it is necessary to disable the transmitter between such program intervals, so that an existing key signal pattern may be erased and a new pattern recorded on the code tape 27.

Figure 1A:
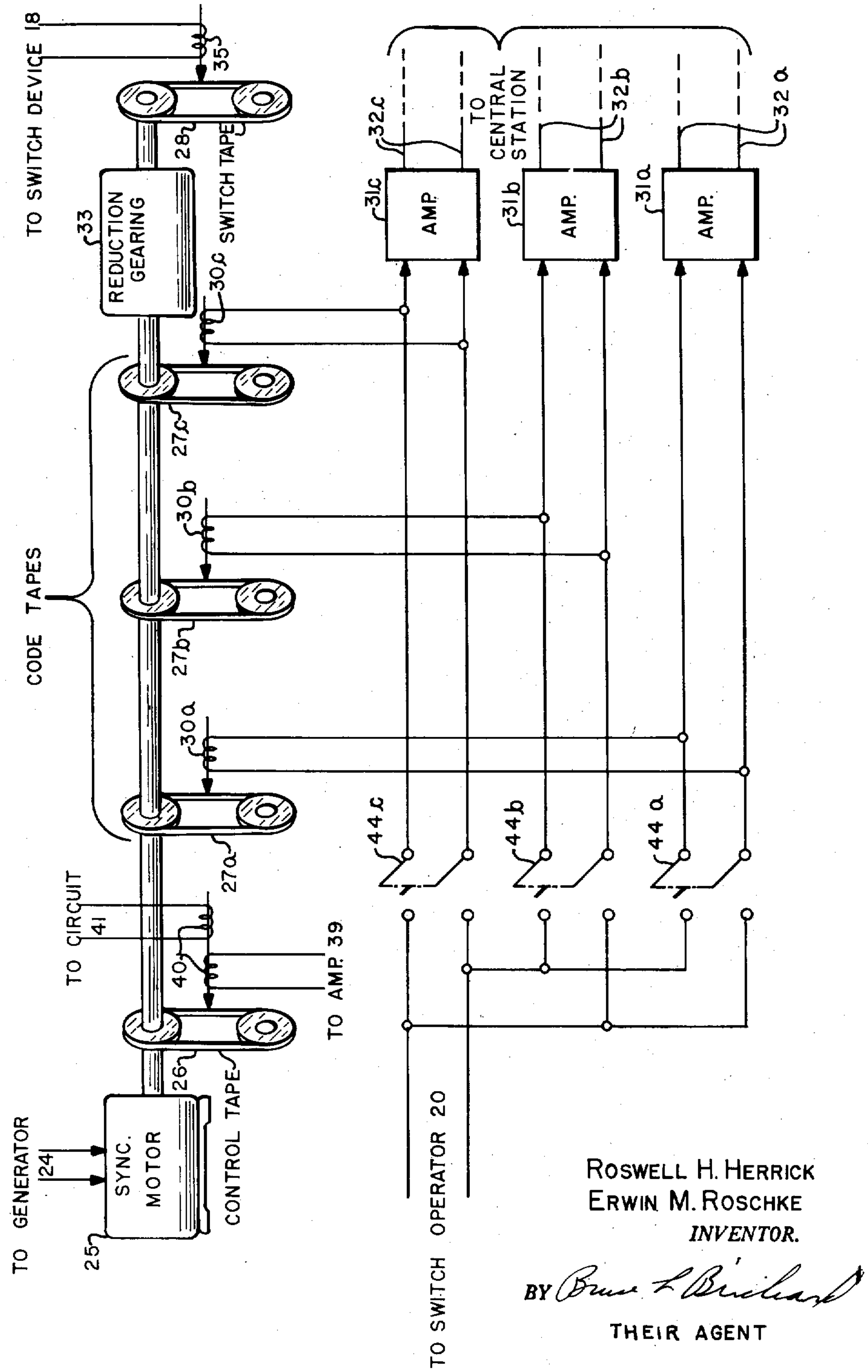
Figure 1A shows a modification of a portion of the transmitter of Figure 1.

Figure 1A shows a modification of the system of Figure 1, and in the modified system a plurality of code tapes 27*a*, 27*b*, 27*c* each have a different key signal pattern recorded thereon. The different key signal patterns may be recorded on the respective code tapes by means of the apparatus shown and described in the system of Figure 1, this recording being effected before actual transmission of the television signal, that is before any of the program intervals.

Amplifiers 31*a*, 31*b*, 31*c* have input terminals connected respectively to the pick-up heads 30*a*, 30*b*, 30*c* associated respectively with the code tapes 27*a*, 27*b*, 27*c*; and the output terminals of these amplifiers are connected to respective line circuits 32*a*, 32*b*, 32*c* extending to the central station (not shown). The key signal patterns on the code tapes are amplified in the respective amplifiers and are transmitted over the line circuits to the central station. For a certain program interval, for example, for the first television program, a switch 44*a* is closed, and the pattern from the code tape 27*a* is used to code the television signal during the interval of this program. At the end of this program, switch 44*a* may be opened and switch 44*b* closed, and the pattern from code tape 27*b* used to code the television signal for the next succeeding program interval. Similarly, the pattern on the code tape 27*c* may be selected and used to code the television signal for an ensuing program interval. In this manner the coding of the television signal may be changed for each program or group of programs, without the need of disabling the transmitter to erase an existing signal pattern from the code tape and to record a new pattern thereon. It will be understood that the selector switches 44*a*, 44*b*, 44*c* may be actuated by any well known form of time control apparatus to accomplish a change from one code tape to another automatically and at preselected time intervals.

Figure 2 shows graphically the various signals recorded on the tapes driven by the motor 25 of Figure 1, and the relation of these signals to each other, to the vertical synchronizing pulses from generator 9, and to the pulses from random frequency divider 17. Referring now to Figure 2, the vertical synchronizing pulses are shown in curve 2A, and these pulses occur at the indicated intervals. The vertical synchronizing pulses of curve 2A are impressed on random frequency divider 17 of Figure 1, and this divider acts, as described in previously mentioned copending application Serial No. 32,457, to select at random, certain of the vertical pulses, such selected pulses being shown in curve 2B. The signal recorded on control tape 26 of Figure 1 is illustrated in curve 2C. This signal may conveniently have a frequency of 3,000 cycles per second, and is so phased that the leading edge thereof reaches head 40 of Figure 1 and is picked-up by this head in the interval between two vertical synchronizing pulses, such as pulses 45 and 46 of curve 2A. The control signal continues to be picked-up by head 40 up to the interval between pulses 46 and 47 of curve 2A. The switching signal recorded on tape 28 of Figure 1 has any suitable frequency, and the tape 28 is adjusted so that this switching signal is phased to be first picked-up by head 35 and applied to switching device 18 at the same instant that the control signal of curve 2C is first picked-up by head 40; assuming that switch 38 is closed. The switching signal is shown in curve 2D and continues for a complete revolution of the control tape 26 and the code tape 27, these latter two tapes rotating at identical speeds. Hence, switching device 18 is closed in the interval between the vertical synchronizing pulses 45 and 46, remains closed for a complete revolution of the code tape, and is opened by the termination of the switching signal of curve 2D, the trailing edge of the switching signal passing the head 35 in the interval between vertical synchronizing pulse 48 and the next succeeding vertical pulse. When switching device 18 is closed, the pulses of curve 2B are impressed on key signal oscillator 19 and a burst of key signal from this oscillator is recorded on code tape 27 in response to each pulse. Hence, pulses 49—53 of curve 2B cause bursts of key signal 54—58 of curve 2E respectively to be recorded on the code tape 27, the burst 58 occurring just before the switch signal of curve 2D causes switching device 18 to open, sufficient time being allowed so that the entire burst 58 is recorded on the code tape 27. The bursts 54—58 recorded on the code tape constitute the key signal pattern and as previously described, switch 38 is then opened, and this pattern is used recurrently to actuate the filter and switch operator 20 of Figure 1 until such time that it is desired to change the coding pattern of the system.

The switching device 18 is shown in detail in Figure 3. The switch signal from pick-up head 35 of switch tape 28 of Figure 1 is impressed across terminals 59, one of the terminals 59 being grounded and the other being coupled to a control electrode 60 of an electron discharge device 61 through a capacitor 62. The control electrode 60 of device 61 is connected to ground through a grid leak resistor 63, and the cathode 64 of this device is connected directly to ground. The anode 65 of device 61 is connected to a source 66 of unidirectional potential through a tuned circuit 67, the negative terminal of source 66 being grounded. The tuned circuit 67 consists of an inductor 68 shunted by a capacitor 69, this circuit being sharply tuned to be resonant at the frequency of the switching signal from tape 28 of Figure 1. The circuit of device 61 amplifies the switching signal, and discriminates against signals having frequencies other than the frequency of this switching signal. The amplified switching signal from device 61 is rectified by a rectifying device 70, this rectifying device having a cathode connected to anode 65 of device 61, and an anode connected to a control electrode 71 of an electron discharge device 72. Control electrode 71 of discharge device 72 is connected to the common junction of series connected resistors 73 and 74, these resistors being connected across source 66 as shown. The anode of device 70 is coupled to ground through capacitor 75. The anode 76 of discharge device 72 is connected to the positive terminal of source 66, and the cathode 77 of this device is connected to the cathode 78 of a discharge device 79, the cathodes 77 and 78 being connected to ground through a common resistor 80. The device 72 is so arranged that in the absence of the switching signal across terminals 59, this device is highly conductive due to the positive bias on its control electrode 71 from the potential divider action of resistors 73 and 74. The space current flowing in device 72 causes a current flow through common cathode resistor 80, hence increasing the potential on cathodes 77 and 78. The device 79 is so arranged that under these circumstances this device is rendered non-conductive. When the switching signal is applied across terminals 59, this signal, amplified by device 61 and rectified by device 70, decreases the potential on control electrode 71 of device 72, and accordingly decreases the space current flowing in device 72. This causes the current through common cathode resistor 80 also to decrease, and the potential of cathode 78 drops to a point where device 79 becomes conductive.

Pulses of positive polarity from frequency divider 17 of Figure 1 are impressed across terminals 81, one of these terminals being grounded and the other being coupled to control electrode 82 of device 79 through a capacitor 83, and control electrode 82 being connected to ground through a grid leak resistor 84. The anode 85 of device 79 is connected to the positive terminal of source 66 through load resistor 86, and this anode is connected to one of a pair of output terminals 87, the other of these terminals being grounded. Output terminals 87 are connected to the key signal oscillator 19 of Figure 1. In the absence of the switching signal across terminals 59, the device 79 is non-conductive, and the frequency divided pulses impressed across terminals 81 do not appear at terminals 87. However, when the switching signal appears at terminals 59, the pulses at terminals 81 are amplified by device 79, and these amplified pulses are obtained across terminals 87 to actuate key signal oscillator 19 during spaced operating intervals.

The control signal phasing circuit 41 of Figure 1 is shown in detail in Figure 4, and diagrams explaining its operation are shown in Figure 5. In the circuit of Figure 4, vertical blanking pulses from generator 9 of Figure 1 are impressed across terminals 88, these pulses having a form such as shown in curve 5A. The blanking pulses impressed across terminals 88 are differentiated in a differentiating circuit which includes a capacitor 89 and a resistor 90, the differential pulses having the form shown in curve 5B. These differentiated pulses are applied to the control electrode 91 of an electron discharge device 92 through a winding 93 of a transformer 94 and through a coupling capacitor 95, control electrode 91 of device 92 being connected to ground through an adjustable resistor 96. The discharge device 92 is connected as a conventional blocking oscillator circuit. The cathode 97 of this device is connected to ground through a cathode resistor 98 shunted by a capacitor 99. The anode 100 of device 92 is connected to the positive terminal of a source 101 of unidirectional potential through a further winding 102 of transformer 94 and through a load resistor 103. Pulses of negative polarity appear at the anode 100 of device 92, and the blocking oscillator is so adjusted that these pulses have the form and duration shown in curve 5C. The pulse output of the first blocking oscillator is differentiated by a differentiating circuit consisting of a capacitor 104 and a resistor 105, and the differentiated pulses, shown in curve 5D, are used to trigger a second blocking oscillator. The differentiated pulses are impressed on the control electrode 106 of an electron discharge device 107 through a winding 108 of a transformer 109 and through a coupling capacitor 110, control electrode 106 being connected to ground through an adjustable resistor 111. The cathode 112 of device 107 is connected to ground through a cathode resistor 113. The anode 114 of device 107 is connected to the positive terminal of source 101 through further winding 115 of transformer 109. The positive peaks of the differentiated pulses, shown in curve 5D, which peaks correspond to the trailing edges of the pulses from the first blocking oscillator, trigger the second blocking oscillator in the usual manner, the second blocking oscillator being adjusted to produce pulses of positive polarity, as shown in curve 5E, across its cathode resistor 113.

The control signal from pick-up head 40 of control tape 26 of Figure 1 is shown in curve 5G and is impressed across terminals 116. One of the terminals 116 is grounded and the other is coupled to the control electrode 117 of an electron discharge device 118 through a capacitor 119, control electrode 117 being connected to ground through a grid leak resistor 120. The cathode 121 of device 118 is connected to ground, and anode 122 of this device is connected to the positive terminal of a source 123 of unidirectional potential through a tuned circuit 124, consisting of an inductor 125 shunted by a capacitor 126, and the negative terminal of source 123 is grounded. The circuit 124 is tuned to be resonant at the frequency of the control signal impressed across terminals 116, and the circuit of device 116 amplifies this control signal and discriminates against signals having frequencies other than that of the control signal.

The amplified control signal from device 118 is rectified by means of a rectifying device 127. The anode of device 127 is connected to the anode 122 of device 118, and the cathode of device 127 is coupled to ground through a capacitor 128 and a shunt connected resistor 129. A positive unidirectional potential, as shown in curve 5H, appears across resistor 129 in response to the amplified control signal, and this potential is applied to the control electrode 130 of an electron discharge device 131. Cathode 132 of device 131 is connected to ground through a resistor 133 shunted by a capacitor 134. Cathode 132 is further connected to the positive terminal of source 123 through a resistor 135, and this cathode is positively biased by the potential divider action of resistor 135 and resistor 133. Screen electrode 136 is connected to the positive terminal of source 123 through a resistor 137, and this electrode is coupled to ground through a by-pass capacitor 138.

Pulses from the second blocking oscillator, shown in curve 5E, are impressed on a second control electrode 139 of device 131 from cathode 112 of device 107 through a coupling capacitor 140, this control electrode being connected to ground through a grid leak resistor 141. Device 131 is so biased that this device becomes conductive only at such intervals when the rectified control signal, as shown in curve 5H, is impressed on control electrode 130 at the same time that the pulses, shown in curve 5E, are impressed on control electrode 139. At such intervals of signal coincidence, the potential of anode 142 drops due to the current flow through load resistor 143, which resistor connects this anode to the positive terminal of source 123.

The anode 142 of device 131 is coupled to the control electrode 144 of an electron discharge device 145 through a coupling capacitor 146, the control electrode 144 being connected to ground through a grid leak resistor 147. The anode 148 of device 145 is connected to the positive terminal of source 123, and the control electrode 144 of this device is also connected to this positive terminal through a resistor 149. The cathode 150 of device 145 is connected to the cathode 151 of an electron discharge device 152, and these cathodes are connected to ground through a common cathode resistor 153. When discharge device 131 is in its non-conductive state and the anode 142 of this device is at a relatively high potential, the control electrode 144 of device 145 is biased positively due to the potential divider action of resistors 149 and 147, and under these circumstances a large amount of space current flows in device 145. This flow of space current causes the discharge device 152 to be non-conductive due to the potential drop across the common cathode resistor 153. However, when the anode 142 of device 131 drops to a relatively low potential value due to the conductivity of device 131, the positive bias on control electrode 144 of device 145 is reduced and the resulting decrease in space current through device 145 causes the device 152 to become conductive to positive signals impressed on control electrode 154. Hence, device 152 is conditioned to repeat positive pulses applied to control electrode 154, whenever the rectified control signal is impressed on control electrode 130 of device 131 simultaneously with the application of a pulse from the second blocking oscillator on control electrode 139 of this device.

Vertical synchronizing signal equalizer pulses are obtained from generator 9 and these pulses are frequency multiplied in multiplier 43 of Figure 1 to a frequency of 120 kilocycles per second, for example. The frequency multiplied vertical equalizer pulses, shown in curve 5F, are impressed continuously across terminals 157, one of these terminals being grounded and the other being connected to control electrode 154 of device 152. The anode 155 of device 152 is connected to the positive terminal of source 123 through a load resistor 156 and a pair of output terminals 275 are connected to this anode and to ground. Device 152 repeats positive pulses applied to control electrode 154 only during such intervals when the control signal shown in curve 5G, and the pulse output of the second blocking oscillator shown in curve 5E, occur simultaneously, and during such intervals a burst of the multiplied equalizer pulses, shown in curve 5J, appears across output terminals 275.

Hence, it can be seen that the control signal from control tape 26 of Figure 1 is transmitted over conductors 32, and occurs once per revolution of the control tape and code tape, and lasts for a short interval. This control signal furthermore causes a burst of signal composed of multiplied equalizer pulses to be radiated on the video carrier once per revolution of these tapes. The phasing circuit 41 of Figures 1 and 4 operates as described, so that this burst of signal appears on a vertical blanking pulse, preferably on the portion of this pulse following the vertical synchronizing pulse.

It is necessary to distribute the key signal pattern recorded on the code tape 27 of the system of Figure 1, or the patterns on the code tapes 27*a*, 27*b*, 27*c* of the modification shown in Figure 1A, to the subscriber receivers. This distribution may be conveniently accomplished by suitable switching apparatus at the transmitter, or by a distributing station located near a group of subscriber receivers. Such a distributing station is shown in Figure 6, wherein line circuits 32*a*, 32*b*, 32*c* extending from the transmitter are brought into the central station as shown. The line circuits 32*a*, 32*b*, 32*c* respectively carry recurring key signal patterns corresponding to the patterns on the respective tapes 27*a*, 27*b*, 27*c* of Figure 1A; and these circuits are connected to selector switches 158*a*, 158*b*, and others when so desired. The selector switches 158*a* and 158*b* are connected respectively to switching devices 159*a* and 159*b*, and these devices are in turn respectively coupled to telephone head-sets 160*a*, 160*b*. The coupling to the head-sets may be accomplished by inductive coupling between coils 161*a* and 161*b* and the respective voice coils in the head-sets, or by other suitable means. The telephones are connected to subscriber receivers over the usual telephone networks and connection is made to these networks by lines 162*a*, 162*b*.

The switching devices 159*a* and 159*b* are connected to a pick-up head 163 associated with a tape 164, through respective switches 165*a* and 165*b*. A permanent signal is recorded on tape 164 by any known means, and this signal is impressed on devices 159*a* or 159*b* whenever switches 165*a* or 165*b* are closed. The devices 159*a* and 159*b* are similar to the switch device 18 of Figures 1 and 3, and these devices close the connection from selector switches 158*a* and 158*b* to coils 161*a* and 161*b* whenever the signal from tape 164 is impressed thereon. The tape 164 is synchronized with the tapes 26, 27 and 28 of Figure 1, and is driven at a speed that is some sub-multiple of the speed of tapes 26 and 27, for example, at one revolution per minute. Synchronization between the tape 164 and the transmitter tapes is effected by means of a television receiver 166. This receiver is coupled to a suitable antenna and tuned to the television signal transmitted by the system of Figure 1. Vertical synchronizing pulses are separated from the received television signal and applied to a generator 167 which drives a synchronous motor 168, which in turn drives the tape 164 at the required speed. The length of the signal recorded on tape 164 is made such that when this tape is revolved at the required speed and switch 165*a* is closed, device 159*a* is caused to close for a time interval corresponding to one revolution of the code tape 27 of Figure 1. Similarly, when switch 165*b* is closed, device 159*b* is caused to close for a time interval corresponding to one revolution of the code tape 27.

Hence, some time before the program intervals of the transmitter of Figure 1, a subscriber may receive key signal patterns to decode the television signal for one or more program intervals, whatever he desires. To do this the subscriber merely calls the central station, this call being received for example over the line 162*a* on the telephone 160*a*. An operator answers his call and instructs him to erase all signals from the tapes of his receiver (the receiver tapes and apparatus associated therewith are to be described herein at a later point). The operator then requests the subscriber to switch in the first receiver tape, and the selector switch is then moved to select the line circuit 32*a*. Just prior to the coincidence of the leading edge of the signal on tape 164 with the pick-up head 163, the operator closes switch 165*a*, and leaves this switch closed until the trailing edge of the signal on tape 164 has passed the head 163, and then switch 165*a* is opened. In this manner, a single occurrence of the recurring key signal pattern on line 32*a* is transmitted to the subscriber receiver where it is recorded on a receiver tape. The operator then instructs the subscriber to switch in his second tape, and turns the selector switch 158*a* to select line 32*b* and the operation is repeated. By similar operations, the single occurrence of the key signal pattern on line 32*c* may be transmitted to the subscriber receiver, to be recorded on the third receiver tape.

Hence, the subscriber receiver may obtain one, two or three key signal patterns, each of which conditions his receiver to decode the television signals for a certain program interval. It is pointed out that such conditioning of the subscriber receivers may be carried out several hours before the program intervals, so that at the beginning of the first program interval, all the subscribers desiring to receive the ensuing programs are equipped with the necessary key signal patterns.

The whole operation of distributing the key signal patterns to a subscriber receiver takes place in a relatively short interval before the commencement of the program interval, and each subscriber uses the telephone network only for the short interval before the program interval and not continuously, as in previously disclosed systems. Many subscribers may be served over the telephone head-sets 160a and 160b, and additional head-sets may be installed in the central station when the number of subscriber receivers in the locality of the station warrants such installation.

The apparatus of the central station has been described as being manually controlled by an operator. However, when so desired automatic control means may be used to effect the receiver switching operations in response to a request for the key signal patterns by a subscriber.

A subscriber receiver for receiving and decoding the composite television signal from the transmitter of Figure 1 is shown in Figure 7. The receiver comprises a tuner and detector 169 which may be coupled to any suitable antenna 170. The tuner and detector is connected to a video amplifier 171 which in turn is connected to a usual image tube or reproducing device 172. Synchronizing signal components in the received television signal are separated therefrom by means of a synchronizing signal separator 173 coupled to the output terminals of detector 169 and further coupled to a vertical sweep generator 174, and to a horizontal sweep generator 176 through a delay line and switch 175. The vertical and horizontal sweep generators are respectively connected to the vertical sweep coils 177 and horizontal sweep coils 178 associated with tube 172. The delay line and switch 175 is controlled by a key signal filter and switch operator 179 coupled thereto by means of three leads 180. The switch operator 179 is also connected to the vertical sweep generator 174 by means of leads 181, and to a pick-up head 182 associated with a receiver tape 183 by way of leads 184.

In the operation of the receiver described to this point, the coded television signal from the system of Figure 1 is received on antenna 170, and tuned and detected in receiver stages 169. The video-frequency components of the detected signal are amplified in the amplifier 171 and are then impressed upon the reproducing device 172, in the usual manner, to control the intensity of the cathode ray beam in this tube. The synchronizing-signal components of the detected signal are separated therefrom in the separator stage 173, and the vertical synchronizing pulses are used to synchronize the vertical sweep generator 174 with the received signal. The horizontal synchronizing pulses are applied to the horizontal sweep generator 176 through a delay line and switch 175, and this delay line and switch operates in two positions, in a manner similar to the corresponding stage 14 of the transmitter of Figure 1, to pass the horizontal synchronizing pulses undelayed in one position of the delay line and switch and to delay the passage of these pulses in the other position thereof. The delay line and switch 175 is switched from one position to another by the key signal filter and switch operator 179, and the key signal filter and switch operator 179 is responsive to the coincidence of key signals from tape 183 on leads 184 and vertical blanking pulses from the vertical sweep generator 174 on leads 181. The key signal filter and switch operator is sharply tuned to be responsive to signals on leads 184 of the frequency of each key signal burst and to discriminate against other signal frequencies. As fully described in copending application Serial No. 773,848, when the key signals on leads 184 are properly timed with the key signals at the transmitter, delay line and switch 175 is operated in synchronism with the delay line and switch 14 of Figure 1. Hence, delay line and switch 175 acts to delay the horizontal scanning of the image tube 172 during the spaced intervals when the video-frequency components of the received television signal are delayed, and therefore acts to compensate for the delay and thus to decode the received television signal. Under these conditions, image tube 172 reproduces the intelligence contained in the received television signal.

In contrast with the previously disclosed systems, the key signals are not impressed directly on the leads 184 over a line circuit extending to the transmitter. In the present system, to receive the key signal the subscriber calls the central station of Figure 6 by means of a telephone head-set 185 which is connected to the usual telephone network by a line 186. A recording coil 187 associated with tape 183 is shown coupled to the line 186 by way of a switch 188' and an inductance coil 188 coupled to the voice coil in the head set 185, although any known coupling or connecting means between the recording coil 187 and the line 186 may be used. An erasing signal source 189 is connected through a switch 190 to an erasing head 191 associated with the tape 183. After connection has been made with the central station, the subscriber is requested to erase any existing signal from the tape 183, and to do this he closes switch 190 for several revolutions of the tape. When the erasing is completed, and switch 190 is opened, a single key signal pattern is transmitted over the line circuit from the central station, as previously described, and is recorded on the tape 183. The recorded pattern is impressed on leads 184 by means of the pick-up head 182, and this pattern is used recurrently as a decoding signal to decode the received television signal until such time as the key signal pattern at the transmitter is changed.

The receiver tape 183 is driven by a motor 189', and during intervals when a new key signal pattern is being recorded on this tape the subscriber closes a switch 260 in the leads connecting the synchronizing signal separator 173 to a multivibrator 192. This causes the multivibrator 192 to be synchronized with the vertical synchronizing pulses of the received subscription television signal, and this multivibrator synchronizes a generator 196 at this frequency. The generator 196 in turn drives the motor 189' at this synchronous frequency, and therefore when the switch 260 is closed the receiver tape 183 revolves at a speed identical with that of the transmitting code tape 27 of Figure 1. Hence, the key signal pattern recorded on the receiver tape 183 is identical to the key signal pattern on the transmitter code tape 27 of Figure 1.

When the recording operation at the receiver is completed, the switch 260 is opened, the switch 188' is opened and the motor 189 is synchronized in the following manner: Vertical synchronizing signals from the separator 173 are impressed on the multivibrator circuit 192 by way of leads 193, a switch device 194, and leads 195. When the switch device 194 is closed the multivibrator 192 is synchronized at the frequency of the vertical synchronizing pulses. The multivibrator 192 in turn synchronizes a generator 196 at this frequency, and the generator drives the synchronous motor 189' at the required speed so that the receiver tape 183 revolves at the same rate as the code tape 27 of Figure 1.

Since identical key signal patterns are recorded on the transmitter and receiver tapes, and since these tapes are rotated at the same speed, as long as these patterns are in phase with each other, the television signal is coded at the transmitter and decoded at the receiver, and device 172 reproduces an undistorted television image. However, should receiver tape 183 fall out of step with the code tape 27 of Figure 1 due to the receiver being shut off for a certain period, or for other reasons, the key signal pattern recorded on the receiver tape is no longer in phase with the key signal pattern recorded on the transmitter code tape and, hence, the receiver is no longer able to decode the coded signals. For this reason, means are provided for bringing the receiver tape back into step with the transmitter tape, and this is accomplished in a manner to be described. The control signal from control tape 26 of Figure 1 is received over line 186 with the key signal pattern, and this control signal is recorded on tape 183 together with the key signal pattern, and applied to the switch device 194 over leads 197. This control signal is also applied to switch operator 179 over leads 184, but as previously described the control signal has a different frequency than the key signal and the switch operator 179 discriminates against and is unresponsive to this control signal. Similarly, the key signal is also applied to switch device 194 over leads 197, but the switch device 194 discriminates against all frequencies except that of the control signal. The equalizing pulses of multiplied frequency from control signal phasing circuit 41 of Figure 1 are selected from the received television signal by a conventional filter and rectifier 198, and the rectified output of filter and rectifier 198 is also impressed on switching device 194. A single time coincidence of a signal from filter and rectifier 198, and the control signal from leads 197, causes the switching device 194 to close and remain closed, thus passing the vertical synchronizing signals from leads 193 to leads 195 and hence to multivibrator 192. The multivibrator 192 is given a fre-running rate which is slightly lower than the frequency of the vertical synchronizing signals. When the receiver tape 183 is out of step with the transmitter code tape 27 of Figure 1, the subscriber depresses a push button, not shown, on switch device 194 which opens this device until the next coincidence of the control signal and signal from rectifier 198. When device 194 is open, multivibrator 192 oscillates at its free-running rate and synchronizes generator 196 at a slightly lower frequency than that of the vertical synchronizing signals, and therefore tape 183 turns at a slightly lower speed. When the control signal on tape 183 aligns itself with the control signal on tape 26 of Figure 1, the signal from filter and rectifier 198 and the control signal from tape 183 occur simultaneously at switching device 194, and this simultaneous occurrence causes the switching device 194 to close and remain closed, thus passing the vertical synchronizing signals to the multivibrator 192, and the tape 183 immediately locks-in with the transmitter code tape. The receiver is, therefore, again conditioned to decode the received coded signals. As previously stated, switching device 194 is so arranged that when the control signal from tape 183 and the signal from the filter and rectifier 198 occur simultaneously, the switching device 194 closes and immediately passes vertical synchronizing pulses to the multivibrator 192, and continues to pass these synchronizing pulses. Hence, when the receiver tape 183 loses synchronism with the transmitter tape, the operator merely depresses the above mentioned pushbutton and in a short interval synchronism is restored.

The pick-up and recording head 182 may be made adjustable in a direction along the longitudinal axis of the tape 183, as indicated by the arrow 199. This allows for a slight adjustment to be made to compensate for time delays in the lines and circuits used in the transmission of the key signal pattern to the receiver.

In the receiver of Figure 7 as in the transmitter of Figure 1 a single code tape is used and the setting up of the pattern on the tape must be done some time before the program interval. When, as indicated in Figure 1A a plurality of code tapes is used at the transmitter, the key signal pattern may be changed between program intervals by merely switching out one code tape and switching in another. To enable the receiver to decode the television signal when the key signal pattern is so changed at the transmitter, the receiver may be equipped with a plurality of tapes, so that different tapes may be switched into the receiver circuit to correspond with the changes at the transmitter. Such a system for the receiver circuit is shown in Figure 7A.

In the system of Figure 7A, the synchronous motor 189' drives a plurality of receiver tapes 183*a*, 183*b*, 183*c*. Any time before the program intervals the subscriber may call the central station and receive the required patterns and, upon operation of a selector switch 200, may record these patterns respectively on the three tapes. The subscriber may close switch 201*a* and use the pattern on tape 183*a* for the first program interval, and likewise may selectively close switches 201*b* and 201*c* for following program intervals. In each case the tape selected must have a key signal pattern recorded thereon which coincides with the key signal pattern used by the transmitter for that particular interval. Moreover, the change over from any one control tape to another may be achieved automatically by any conventional time controlled selector.

It is pointed out that with the modified systems of Figures 1A and 7A the transmitter may provide three or more patterns for three or more separate intervals, and the subscriber has the option of purchasing one or more of these patterns, depending on the number of programs that he wishes to receive.

Switching device 194 is shown in detail in Figure 8, and referring to this figure, the input terminals of the circuit are designated 202, and these terminals are connected to the leads 197 and hence to pick-up coil 182 of Figure 7. One of the terminals 202 is grounded and the other is coupled to a control electrode 203 of an electron discharge device 204 through a coupling capacitor 205, control electrode 203 being connected to ground through a grid leak resistor 206. The cathode 207 of device 204 is connected directly to ground, and the anode 208 of this device is connected to the positive terminal of a source 209 of unidirectional potential through a tuned circuit 210, the negative terminal of source 209 being grounded. The tuned circuit 210 consists of an inductor 211 shunted by a capacitor 212, this circuit being tuned to be resonant at the frequency of the control signal on tape 183 of Figure 7, so that this signal is amplified by the circuit of device 194, and all other signals are discriminated against.

A rectifying device 213 has its anode connected to anode 208 of device 204 and its cathode connected to a control electrode 214 of an electron discharge device 215, the common junction between the cathode of device 213 and control electrode 214 of device 215 being connected to ground through a resistor 216, and this resistor being shunted by a capacitor 217. The device 213 conducts until capacitor 217 is charged, and thereafter at a certain point of each revolution of the receiver tape 183 of Figure 7, the control signal recorded thereon appears at anode 208 of device 204, and in response to this signal a positive potential appears across resistor 216. Cathode 218 of device 215 is connected to ground through a cathode resistor 219, this resistor being shunted by a capacitor 220. Cathode 218 is further connected to the positive terminal of source 209 through a resistor 221. The screen electrode 222 of device 215 is connected to the positive terminal of source 209 through a resistor 223, and this electrode is coupled to ground through a capacitor 224. The rectified equalizing pulses of multiplied frequency from filter and rectifier 198 of Figure 7 are impressed across terminals 225, one of these terminals being connected to ground, and the other being coupled to a second control electrode 226 of device 215 through a capacitor 227. Control electrode 226 is connected to ground through a grid leak resistor 228. The anode 229 of device 215 is connected to the positive terminal of source 209 through a load resistor 230. The device 215 is normally biased to cut-off by the positive potential on cathode 218 due to the potential divider action of resistors 221 and 219, and the circuit of this device is so arranged that the device becomes conductive only when the control electrodes 214 and 226 are simultaneously driven positive. As previously described, this condition occurs only when the control signal on control tape 26 of Figure 1 and the control signal on the receiver tape 183 of Figure 7 occur simultaneously, that is, when the tapes at the transmitter and at the receiver are in step.

The anode 229 of device 215 is connected to a control electrode 231 of an electron discharge device 232, this control electrode being connected through a resistor 233 to the negative terminal of a biasing source 234, the positive terminal of this source being grounded. Cathode 235 of device 232 is connected to ground, and the anode 236 of this device is connected to the positive terminal of source 209 through a resistor 237. The anode 236 of device 232 is further connected to the control electrode 238 of an electron discharge device 239 through a resistor 240, this control electrode being connected to the negative terminal of source 234 through a resistor 241, and this resistor being shunted by a push-button 242. Cathode 243 of device 239 is connected to ground, and the anode 244 thereof is connected to the positive terminal of source 209 through a resistor 245. The anode 244 of device 239 is further connected to the control electrode 231 of device 232 through a resistor 246. The control electrode 238 of device 239 is further connected to the control electrode 247 of another electron discharge device 248. The cathode 249 of device 248 is connected to ground through a resistor 250, and the anode 251 of this device is connected to the positive terminal of source 209 through a resistor 252. Vertical synchronizing signals from synchronizing signal separator 173 of Figure 7 are impressed across terminals 253, one of these terminals being grounded and the other being connected to cathode 249 of device 248. When device 248 is conductive, the vertical synchronizing signals impressed across terminals 253 appear across output terminals 254, one of the terminals 254 being grounded and the other being connected to anode 251 of device 248. Terminals 254 are connected to the multivibrator 192 of Figure 7 by way of leads 195.

In normal operation, the value of the negative potential of source 234 is made sufficient to overcome the positive bias on control electrode 231 and drive this control electrode negative, and hence device 232 is non-conductive and the relatively high potential value of anode 236 impresses a positive potential on control electrode 238 of device 239, by reason of the connection of anode 236 to control electrode 238 through resistor 240. This positive potential overcomes the negative bias on control electrode 238 from source 234, and causes device 239 to be conductive. Control electrode 238 of device 239 is connected to control electrode 247 of device 248, and hence in this condition control electrode 247 has a potential impressed thereon sufficiently positive to make device 248 conductive. Hence, vertical synchronizing signals impressed across terminals 253 are conducted by device 248 and appear across terminals 254. Therefore, vertical synchronizing signals from the synchronizing signal separator 173 of Figure 7 are passed by the switching device 194 to the multivibrator 192, and the receiver tape 183 is rotated in synchronism with tape 27 of Figure 1. Should synchronism between the transmitter and receiver tapes be lost, it is merely necessary for the operator to press push-button 242 for a moment and then release this button. When push-button 242 is depressed, negative biasing potential from source 234 is applied directly to control electrode 238 of device 239. This potential is sufficient to drive device 239 to cut-off, and the resulting rise in anode potential of device 239 overcomes the negative bias on control electrode 231 of device 232. Device 232, therefore, becomes highly conductive and holds device 239 in a non-conductive state. Hence, a momentary depression of push button 242 causes device 239 to become non-conductive and device 232 to become conductive. The resulting decrease in potential on control electrode 238 causes the potential on control electrode 247 to be such that device 248 is no longer conductive. In this condition no vertical synchronizing signals are impressed on multivibrator 192 of Figure 7, and the multivibrator in its free-running state causes tape 183 to rotate at a speed slightly below the synchronous speed.

As previously described, when the receiver tape reaches a point where it is in step with the transmitter tape, the signals across terminals 202 and terminals 225 occur simultaneously. This simultaneous occurrence of such signals causes a pulse of negative polarity to appear at anode 229 of device 215. Anode 229 is connected to control electrode 231, and this pulse triggers the circuit of devices 232 and 239, so that once again device 232 is non-conductive and device 239 is conductive, and therefore device 248 is also conductive.

Therefore, in normal operation device 248 is conductive and multivibrator 192 of Figure 7 is synchronized at the frequency of the vertical synchronizing signals. However, when synchronism is lost between the transmitter and receiver tapes, a momentary depression of push-button 242 causes the vertical synchronizing signals to be cut-off from the multivibrator 192 until the time when the tapes are again in step, at which time multivibrator 192 again locks-in with the vertical synchronizing signals.

This invention therefore provides a subscriber system in which electrical signals are transmitted in coded form on a first channel for a certain program interval, and a key signal pattern for decoding coded signals may be transmitted to subscriber receivers at a time prior to this program interval on a second channel, in a time interval substantially shorter than the program interval. Hence, the second channel is used only for a short time interval by an individual subscriber and is not in use during the program intervals.

This invention therefore provides a system in which all the necessary operations for distributing the key signals to subscriber receivers are performed at the transmitter or at a central station, and no use is made of the equipment of external parties, with the exception of the telephone networks, these latter networks being used in an essentially normal manner and for brief intervals for each subscriber.

While specific embodiments of the invention have been shown and described, modifications may be made therein. It is intended in the appended claims to cover all such modifications as fall within the true spirit and scope of the invention.

We claim:

1. A subscription type of signal receiver for utilizing an electrical signal coded in accordance with a repeating code schedule and received over a first signal channel for a predetermined program interval, and a key signal representing said code schedule and received over a second signal channel for a time interval short relative to said program interval; said receiver including: a reproducing device; apparatus for supplying said electrical signal to said reproducing device; a decoding device coupled to said apparatus and responsive to an applied decoding signal for changing the mode of operation of said apparatus to effect decoding of said electrical signal; a signal storage device; apparatus for supplying said received key signal to said storage device to establish in said device a key signal pattern; scanning apparatus for recurrently scanning said storage device during said program interval to derive therefrom in each scanning cycle a decoding signal having a duration equal to that of said code schedule and having characteristic variations representing said code schedule; and means coupling said scanning apparatus to said decoding device for supplying thereto said recurring decoding signal.

2. A subscription type of television receiver for utilizing a composite television signal coded in accordance with a repeating code schedule, including synchronizing-signal components and video-frequency components, and received for a predetermined program interval; said receiver including: an image reproducing device and an associated scanning system; apparatus for supplying said composite television signal to said reproducing device and to said scanning system; a decoding device coupled to said apparatus and responsive to an applied decoding signal for changing the mode of operation of said apparatus to effect decoding of said television signal; a signal storage device having a key signal pattern representing said code schedule recorded thereon in predetermined phase with respect to said synchronizing-signal components; scanning apparatus synchronized with said scanning system for recurrently scanning said recording device during said program interval to derive in each scanning cycle a decoding signal having a duration equal to that of said code schedule and having characteristic variations representing said code schedule; and means coupling said scanning apparatus to said decoding device for supplying thereto said recurring decoding signal.

3. A subscription type of television receiver for utilizing a coded composite television signal including synchronizing-signal components and video-frequency components and received over a first signal channel for a predetermined program interval, and a key signal received over a second signal channel for a time interval short relative to said program interval; said receiver including: an image reproducing device having an associated scanning system; apparatus for supplying said composite television signal to said reproducing device and to said scanning system; a decoding device coupled to said apparatus and responsive to an applied decoding signal for changing the mode of operation of said apparatus to effect decoding of said television signal; a recording device synchronized with said scanning system; apparatus for supplying said received key signal to said recording device to record thereon a key signal pattern; scanning apparatus for recurrently scanning said recording device during said program interval to derive therefrom in each scanning cycle a decoding signal having a duration short relative to said program interval and having characteristic variations determined by said key signal pattern; and means coupling said scanning apparatus to said decoding device for supplying thereto said recurring decoding signal.

4. A subscription type of television receiver for utilizing a television signal received throughout a plurality of predetermined program intervals and coded in accordance with a pre-assigned repeating code schedule in each such program interval; said receiver including: an image reproducing device and an associated scanning system; apparatus for supplying said television signal to said reproducing device and to said scanning system throughout said program intervals; a decoding device coupled to said apparatus and responsive to an applied decoding signal for changing the mode of operation of said apparatus to effect decoding of said television signal; a plurality of records individually having a key signal pattern recorded thereon representing a corresponding one of said code schedules; scanning apparatus for recurrently scanning any of said records during any of said program intervals to derive therefrom in each scanning cycle a decoding signal having a duration equal to that of one of said code schedules and having characteristic variations representing said one schedule determined by said respective key signal pattern; and selective switching means for coupling said scanning apparatus and a selected one of said records to said decoding device during the selected corresponding one of said program intervals to impress thereon a decoding signal having characteristic variations corresponding to the code schedule used for coding the television signal during the selected program interval.

5. A subscription type of television receiver for utilizing a television signal received over a first signal channel throughout a plurality of predetermined program intervals, and coded in accordance with a separate predetermined code for each program interval, and a plurality of distinct key signals received successively over a second signal channel in an interval short relative to any of said program intervals; said receiver including: an image reproducing device and an associated scanning system; apparatus for supplying said composite television signal to said reproducing device and to said scanning system; a decoding device coupled to said apparatus and responsive to an applied decoding signal for changing the mode of operation of said apparatus to effect decoding of said television signal; a plurality of recording devices; selective switching means coupling said second signal channel to said recording devices to supply selectively said key signals to said recording devices to record respective key signal patterns thereon; scanning apparatus for recurrently scanning any of said recording devices during said program intervals to derive therefrom in each scanning cycle a plurality of distinct decoding signals each having characteristic variations determined by said respective key signal patterns; and selective switching means for coupling said scanning apparatus and a selected one of said records to said decoding device during a selected one of said program intervals to impress thereon a decoding signal having characteristic variations corresponding to the code used for coding the television signal in the selected program interval.

6. A subscription type of television receiver for utilizing a received television signal coded in accordance with a certain coding signal, and a received control signal indicating a phase characteristic of said coding signal; said receiver including: an image reproducing device and an associated scanning system; apparatus for supplying said television signal to said reproducing device and to said scanning system; a decoding device coupled to said apparatus and responsive to an applied decoding signal for changing the mode of operation of said apparatus to effect decoding of said television signal; a recording device having a key signal pattern removably recorded thereon; scanning apparatus for recurrently scanning said recording device to derive therefrom a decoding signal having characteristic variations corresponding to said coding signal and determined by said key signal pattern; means coupling said scanning apparatus to said decoding device for supplying thereto said recurring decoding signal; synchronizing apparatus for synchronizing said recording device with said scanning system and actuated by an applied control signal; and means for supplying said received control signal to said synchronizing apparatus.

7. A subscription type of television receiver for utilizing a received television signal and a received first control signal, said television signal being coded in accordance with a certain coding signal and said first control signal indicating a phase characteristic of said coding signal; said receiver including: an image reproducing device and an associated scanning system; apparatus for supplying said television signal to said reproducing device and to said scanning system; a decoding device coupled to said apparatus and responsive to an applied decoding signal for changing the mode of operation of said apparatus to effect decoding of said television signal; a recording device having a key signal pattern recorded thereon; scanning apparatus for recurrently scanning said recording device to derive therefrom a recurring decoding signal having characteristic variations corresponding to said coding signal and determined by said key signal pattern; means coupling said scanning apparatus to said decoding device for supplying thereto said recurring decoding signal; synchronizing apparatus for synchronizing said recording device with said scanning system and actuated by the time coincidence of a pair of applied control signals; means for supplying said received control signal to said synchronizing apparatus; means coupled to said scanning apparatus for producing a second control signal indicating a phase characteristic of said key signal pattern; and means for supplying said second control signal to said synchronizing apparatus.

8. A subscription type of television receiver for utilizing a television signal and a first control signal received over a first signal channel for a predetermined program interval, and a key signal and second control signal received over a second signal channel for an interval short relative to said program interval, said television signal being coded in accordance with a certain coding signal, said first control signal indicating a phase characteristic of said coding signal, and said second control signal indicating a phase characteristic of said key signal; said receiver including: an image reproducing device and an associated scanning system; apparatus for supplying said television signal to said reproducing device and to said scanning system; a decoding device coupled to said apparatus and responsive to an applied decoding signal for changing the mode of operation of said apparatus to effect decoding of said television signal; a recording device; apparatus for supplying said key signal and said second control signal to said recording device to record said key signal and said second control signal thereon; scanning apparatus for recurrently scanning said recording device to derive therefrom a recurring decoding signal having characteristic variations corresponding to said coding signal and determined by the recorded key signal, and for deriving therefrom a third control signal having characteristic variations determined by said recorded second control signal; means coupling said scanning apparatus to said decoding device for supplying thereto said recurring decoding signal; synchronizing apparatus for synchronizing said recording device with said scanning system and responsive to the time coincidence of a pair of applied control signals; means for supplying said first control signal to said synchronizing apparatus; and means coupling said scanning apparatus to said synchronizing apparatus to supply thereto said third control signal.

9. The method of utilizing an electrical signal coded in accordance with a repeating code schedule and received for a predetermined program interval and a key signal representing said code schedule and received for an interval short relative to said program interval which comprises, receiving said key signal for said short interval, storing said key signal during said short interval, receiving said coded electrical signal for said predetermined program interval, and utilizing said stored key signal recurrently to decode said coded electrical signal.

10. A subscription type of television receiver for utilizing a received television signal coded during a program interval in accordance with one of a plurality of different code schedules, said receiver comprising: an image-reproducing device and an associated scanning system; apparatus for supplying said television signal to said reproducing device and to said scanning system and having a plurality of modes of operation; a plurality of storage devices individually having a key signal pattern stored therein representing a corresponding one of said code schedules; means for scanning said storage devices to derive decoding signals corresponding to the patterns stored therein; and switching means for selectively utilizing said decoding signals to control the mode of operation of said apparatus in accordance with the code schedule of said television signal and effect decoding of said television signal.

11. A subscription type of television receiver for utilizing a received television signal coded during a program interval in accordance with one of a plurality of different code schedules, said receiver comprising: an image-reproducing device and an associated scanning system; apparatus for supplying said television signal to said reproducing device and to said scanning system and having a plurality of modes of operation; a decoding device coupled to said apparatus for changing the mode of operation of said apparatus to effect decoding of said television signal; a plurality of records included in said decoding device individually having a key-signal pattern recorded thereon representing a corresponding one of said code schedules; means for scanning said records to derive decoding signals corresponding to the patterns recorded thereon; and means for selectively utilizing said decoding signals to control said decoding device in accordance with the code schedule of said television signal and effect decoding of said television signal.

12. A subscription type of television receiver for utilizing a received television signal coded during a program interval in accordance with one of a plurality of different code schedules, said receiver comprising: an image-reproducing device and an associated scanning system; apparatus for supplying said television signal to said reproducing device and to said scanning system and having a plurality of modes of operation; a decoding device coupled to said apparatus and responsive to an applied decoding signal for changing the mode of operation of said apparatus to effect decoding of said television signal; a plurality of records individually having a key-signal pattern recorded thereon representing a corresponding one of said code schedules; means for scanning said records to derive decoding signals corresponding to the patterns recorded thereon; and switching means for selectively coupling said scanning means to said decoding device to impress thereon a decoding signal having characteristic variations corresponding to the code schedule of said television signal and effect decoding of said television signal.

13. A subscriber receiver for utilizing a received television signal coded in accordance with a coding schedule and for further utilizing a key signal representing said coding schedule, said receiver comprising: an image-reproducing device; means coupled to said device for controlling said device in accordance with said television signal; decoding apparatus included in said means for effectively decoding said television signal; a scanning device included in said decoding apparatus for scanning a code record to derive a decoding signal for controlling the operation of said decoding apparatus; and means responsive to said key signal for presenting to said scanning device a code record having coding information corresponding to said coding schedule of said received signal.

14. A subscriber receiver for utilizing a received television signal coded in accordance with a coding schedule and for further utilizing a key signal representing said coding schedule, said receiver comprising: an image-reproducing device; means coupled to said device for controlling said device in accordance with said television signal; decoding apparatus included in said means for effectively decoding said television signal; a scanning device included in said decoding apparatus for scanning a code record to derive a decoding signal for controlling the operation of said decoding apparatus; apparatus responsive to said key signal for establishing and for presenting to said scanning device a code record representing said coding schedule of said received signal; and means for supplying said key signal to said apparatus.

15. A subscriber receiver for utilizing a received television signal coded in accordance with a coding schedule and for further utilizing a key signal representing said coding schedule, said receiver comprising: an image-reproducing device; means coupled to said device for controlling said device in accordance with said television signal; decoding apparatus included in said means for effectively decoding said television signal; a code record; a scanning device included in said decoding apparatus for scanning said code record to derive therefrom a decoding signal for controlling the operation of said decoding apparatus; and means responsive to said key signal for storing on said record coding information representing at least a portion of said coding schedule of said received signal.

16. A subscriber receiver for utilizing a received television signal coded in accordance with a coding schedule and for further utilizing a key signal representing said coding schedule, said receiver comprising: an image-reproducing device; means coupled to said device for controlling said device in accordance with said television signal; decoding apparatus included in said means for effectively decoding said television signal; a code record; a scanning device included in said decoding apparatus for scanning said code record to derive therefrom a decoding signal for controlling the operation of said decoding apparatus; and means responsive to said key signal for storing on said record coding information representing said coding schedule of said received signal.

ROSWELL H. HERRICK.
ERWIN M. ROSCHKE.

References Cited in the file of this patent

UNITED STATES PATENTS

| Number | Name | Date |
|---|---|---|
| 2,086,961 | Schlesinger | July 13, 1937 |
| 2,164,176 | Goldsmith | June 27, 1939 |
| 2,251,525 | Rosenthal | Aug. 5, 1941 |
| 2,286,540 | Hanson | June 16, 1942 |
| 2,301,504 | Batchelor | Nov. 10, 1942 |
| 2,306,435 | Graham | Dec. 29, 1942 |
| 2,307,728 | Mertz | Jan. 5, 1943 |
| 2,402,067 | Mathes | June 11, 1946 |
| 2,403,540 | Meneley | July 9, 1946 |
| 2,405,252 | Goldsmith | Aug. 6, 1946 |
| 2,472,774 | Mayle | June 7, 1949 |

FOREIGN PATENTS

| Number | Country | Date |
|---|---|---|
| 386,849 | Great Britain | Jan. 26, 1933 |